US010038396B2

(12) United States Patent
Watanabe

(10) Patent No.: US 10,038,396 B2
(45) Date of Patent: Jul. 31, 2018

(54) MOTOR CONTROL DEVICE AND MOTOR DRIVE DEVICE

(71) Applicant: Renesas Electronics Corporation, Kawasaki-shi (JP)

(72) Inventor: Hisaaki Watanabe, Kawasaki (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 373 days.

(21) Appl. No.: 14/436,034

(22) PCT Filed: Oct. 26, 2012

(86) PCT No.: PCT/JP2012/077732
§ 371 (c)(1),
(2) Date: Apr. 15, 2015

(87) PCT Pub. No.: WO2014/064836
PCT Pub. Date: May 1, 2014

(65) Prior Publication Data
US 2015/0270796 A1   Sep. 24, 2015

(51) Int. Cl.
*H03M 1/46* (2006.01)
*H02P 6/10* (2006.01)
(Continued)

(52) U.S. Cl.
CPC ............. *H02P 6/08* (2013.01); *B60L 3/106* (2013.01); *B60L 11/1803* (2013.01);
(Continued)

(58) Field of Classification Search
CPC ............. H02P 21/22; H02P 6/18; H02P 6/28
See application file for complete search history.

(56) References Cited

U.S. PATENT DOCUMENTS 5,461,329 A    10/1995  Linehan et al.
8,633,667 B2 *  1/2014  Watanabe ........... H02P 23/0027
                                                            290/38 R
(Continued)

FOREIGN PATENT DOCUMENTS

EP    2 413 495 A1    2/2012
JP    1998-191678 A   7/1998
(Continued)

OTHER PUBLICATIONS

International Search Report (ISR) (PCT Form PCT/ISA/210), in PCT/JP2012/077732, dated Jan. 15, 2015.
English Translation and Japanese version of Amendment under PCT Article 19.
English Translation and Japanese version of Informal Comment.
Extended European Search Report dated Jul. 8, 2016.

*Primary Examiner* — Eduardo Colon Santana
*Assistant Examiner* — Charles S Laughlin
(74) *Attorney, Agent, or Firm* — McGinn IP Law Group, PLLC

(57) ABSTRACT

A sampling period of information according to a load state of an alternating-current motor is controlled so as to be variable with respect to a carrier period of a PWM circuit, and a predetermined arithmetic operation for aggregating information sampled in one period of the carrier period is performed in a separate arithmetic circuit from a CPU. Thereby, in a situation where the rotation of the alternating-current motor becomes too fast with respect to the carrier period, motor rotation control for suppressing a sudden fluctuation of a motor load can be performed by faster reaction while suppressing an increase in an arithmetic control load of a CPU.

15 Claims, 12 Drawing Sheets

(51) Int. Cl.
  *H02P 6/21* (2016.01)
  *H02P 6/08* (2016.01)
  *H02P 27/08* (2006.01)
  *H02P 21/00* (2016.01)
  *B60L 3/10* (2006.01)
  *B60L 11/18* (2006.01)
  *B60L 15/00* (2006.01)
  *B60L 15/02* (2006.01)
  *B60L 15/20* (2006.01)

(52) U.S. Cl.
  CPC ........... *B60L 15/007* (2013.01); *B60L 15/025* (2013.01); *B60L 15/20* (2013.01); *H02P 21/0003* (2013.01); *H02P 27/085* (2013.01); *B60L 2220/12* (2013.01); *B60L 2240/12* (2013.01); *B60L 2240/421* (2013.01); *B60L 2240/423* (2013.01); *B60L 2240/461* (2013.01); *B60L 2240/465* (2013.01); *Y02T 10/643* (2013.01); *Y02T 10/7005* (2013.01); *Y02T 10/72* (2013.01); *Y02T 10/7275* (2013.01)

(56) References Cited

U.S. PATENT DOCUMENTS

| | | |
|---|---|---|
| 2008/0303470 A1 | 12/2008 | Schulz et al. |
| 2010/0185351 A1 | 7/2010 | Uchiyama et al. |
| 2011/0241579 A1* | 10/2011 | Kimpara ................ B62D 5/046 318/400.02 |

FOREIGN PATENT DOCUMENTS

| | | | |
|---|---|---|---|
| JP | 2001-268997 A | | 9/2001 |
| JP | 2001-352775 A | | 12/2001 |
| JP | 2003-219690 A | | 7/2003 |
| JP | 2004-208371 A | | 7/2004 |
| JP | 2009-040174 A | | 2/2009 |
| JP | WO 2010-109964 | * | 9/2010 |
| JP | WO 2010/109964 A | | 9/2010 |
| JP | 2011-244513 A | | 12/2011 |
| WO | WO 2010/109964 A1 | | 9/2010 |

* cited by examiner

MOTOR CONTROL DEVICE AND MOTOR DRIVE DEVICE

TECHNICAL FIELD

The invention relates to a motor control that performs PWM (Pulse-width modulation) control on the supply of a motor current to an alternating-current motor in accordance with a drive command and feedback information, particularly, a sampling technique of feedback information for a carrier period of PWM, and relates to a technique effective in a case of application to PWM motor control of, for example, an electric vehicle (EV) or a hybrid vehicle (HV).

BACKGROUND ART

In PWM control for an alternating-current motor of an EV or an HV, a current command value generated on the basis of a motor control logic such as vector control which is mounted in a control circuit is given to a PWM circuit, to thereby generate a PWM pulse for applying an output voltage having any amplitude and phase from an inverter to an alternating-current motor. Control of a torque which is generated by the interaction of a motor current with a magnetic flux which is interlinked with a winding of the alternating-current motor is required for controlling the rotational speed of an alternating-current motor and the position of a rotor at high speed. For this reason, the control circuit generates a current command value to a drive command for each phase while referring to current information which is fed back from a feedback loop of the motor current or position information of the rotor, and gives the generated value to the PWM circuit. Such general PWM control for the alternating-current motor is disclosed in, for example, PTL 1.

In the PWM control for the alternating-current motor, the rotation speed of the alternating-current motor is sufficiently slow in a carrier period of the PWM circuit. Thus, in case that a motor current acquisition period corresponding to the carrier period is generated in the acquisition of the motor current from the feedback loop, it is possible to acquire a sinusoidal motor current, and to reflect arithmetic results based on the fed-back motor current or the like in the PWM pulse. For example, in case that a sinusoidal wave is represented by more than twelve divisions with respect to a carrier period having a frequency of 10 kHz, the rotation speed of the alternating-current motor can attain up to 833 Hz.

CITATION LIST

Patent Literature

PTL 1: Domestic Re-publication of PCT Patent Application No. 2010/109964

DISCLOSURE OF THE INVENTION

Problems that the Invention is to Solve

The inventor has examined a case where the rotation speed of an alternating-current motor becomes too fast with respect to a carrier period of a PWM circuit. In case that the rotation of the alternating-current motor becomes too fast with respect to the carrier period, a motor current is not able to be acquired in a sinusoidal shape. In this case, the shortening of a current acquisition period makes it possible to acquire a current, but a PWM pulse to be reflected is dependent on the carrier period, and thus feedback current values acquired during the carrier period have to be arithmetically calculated collectively by filtering or averaging, to thereby reflect the resultant in a duty of the PWM pulse. In this case, arithmetic responsiveness of filtering or averaging is dependent on a current acquisition period or a filter gain, and thus controllability deteriorates as compared to normal control. In addition, in a high-rotation region of the alternating-current motor, since a load of arithmetic control of a CPU has a tendency to become larger to make matters worse, the shortening of a sampling interval of a feedback current causes a further increase in the load of the CPU. Thus, it was made clear that there might be a concern of the sampling interval of the feedback current not being able to be sufficiently shortened. Particularly, a situation where the rotation speed of the alternating-current motor which is a traveling drive source of an EV or an HV becomes too fast with respect to the carrier period is assumed to be generated by the skidding of a wheel due to a slip. This may be an induction factor for an accident caused by sudden acceleration, abrupt steering, road surface freezing, and the like. Thus, a sudden fluctuation of the load has to be suppressed by at least faster reaction to the skidding of a wheel. Therefore, it is necessary to control the rotational speed of a motor in a direction in which a sudden fluctuation of a load is suppressed by faster reaction to a situation where the rotation of the alternating-current motor becomes too fast with respect to the carrier period.

The foregoing and other problems and novel features for solving the problems will be made clearer from the description of the present specification and the accompanying drawings.

Means for Solving the Problems

The following is a brief description of the representative embodiments disclosed in the present application.

That is, a sampling period of information according to a load state of an alternating-current motor is controlled so as to be variable with respect to a carrier period of a PWM circuit, and a predetermined arithmetic operation for aggregating information sampled in one period of the carrier period is performed in a separate arithmetic circuit from a CPU.

Effects of the Invention

The following is a brief description of an effect obtained by the representative embodiments of the invention disclosed in the present application.

That is, in a situation where the rotation of the alternating-current motor becomes too fast with respect to the carrier period, motor rotation control for suppressing a sudden fluctuation of a motor load can be performed by faster reaction while suppressing an increase in an arithmetic control load of a CPU.

BEST MODE FOR CARRYING OUT THE INVENTION

1. Summary of the Embodiments

Figure 1:
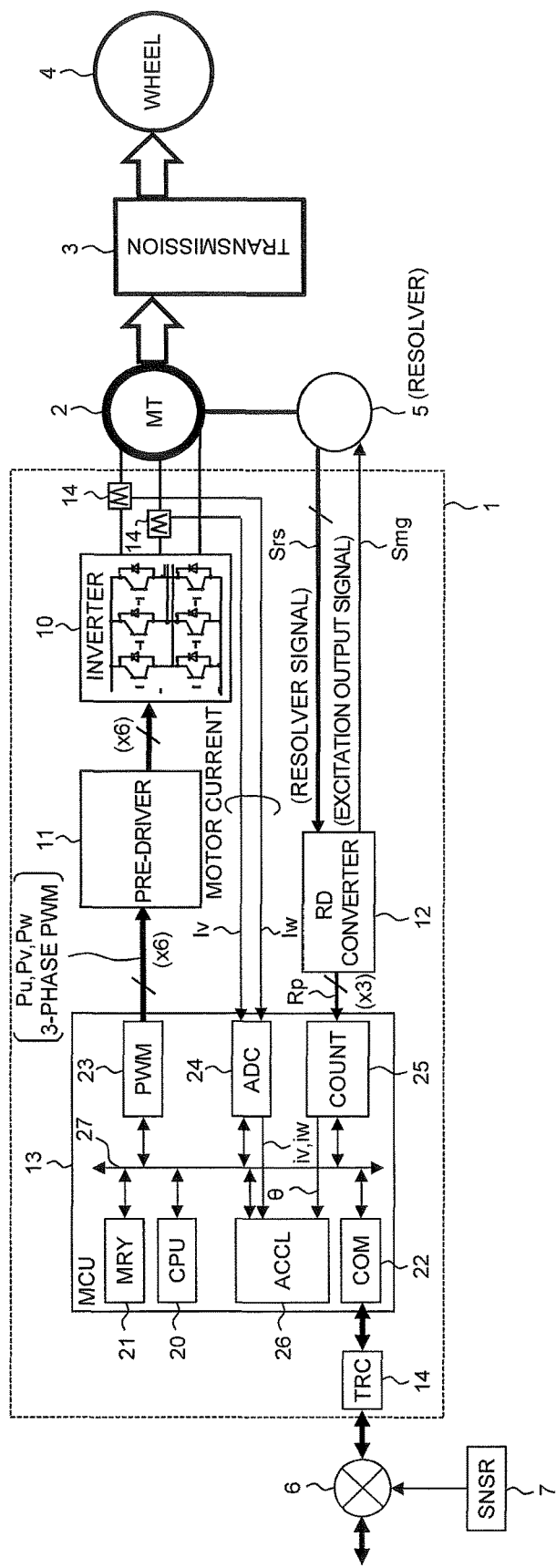
FIG. 1 is a block diagram illustrating an example of a motor drive device.

First, summary of representative embodiments of the invention disclosed in the application will be described. Reference numerals in drawings in parentheses referred to in description of the summary of the representative embodiments just denote components included in the concept of the components to which the reference numerals are designated.

[1] <Making Sampling Period of Load Fluctuation Variable with Respect to PWM Carrier Period>

A motor control device (13) according to a representative embodiment includes a PWM circuit (23) for performing switch control on an inverter (10) that outputs a drive current to an alternating-current motor (2) through a PWM pulse signal (Pu, Pv, Pw), a CPU (20) that performs feedback control on a duty of the PWM pulse signal, and an arithmetic unit (26, 26A), in which a sampling period of feedback information (iv, iw, θ) is made variable, and which performs predetermined arithmetic processing for aggregating the feedback information acquired in the sampling period shorter than a carrier period of the PWM circuit in a comparison target for one period of the carrier period in case that a predetermined load fluctuation is generated in the alternating-current motor. The CPU controls the duty of the PWM pulse signal after the predetermined load fluctuation is generated, on the basis of an arithmetic result in the arithmetic unit and the drive command value.

According to this, it is possible to acquire the feedback information in a period shorter than the carrier period in accordance with a predetermined fluctuation of a motor load, and to burden the arithmetic unit with an arithmetic operation for aggregating a plurality of pieces of feedback information, acquired in the carrier period alone, in the comparison target for one period of the carrier period. Therefore, in a situation where the rotation of the alternating-current motor becomes too fast with respect to the carrier period, motor rotation control for suppressing a sudden fluctuation of a motor load can be performed by faster reaction while suppressing an increase in an arithmetic control load of a CPU.

[2] <Information of Motor Current and Rotor Angle of Motor>

In item 1, the feedback information is a motor current value (iv, iw) which is obtained by performing AD conversion on a current which is fed back from an alternating-current motor and a rotor rotation angle value (θ) which is obtained from a rotor position of the alternating-current motor.

According to this, the motor control device is suitable for vector control of the alternating-current motor.

[3] <Control Circuit Detects Load Fluctuation to Change Sampling Period>

In item 2, in case that a predetermined load fluctuation is generated in the alternating-current motor, the control unit (26) includes a control circuit (46) that controls a sampling period of feedback information so as to be variable, and an arithmetic circuit (47) that performs the predetermined arithmetic processing. The control circuit determines whether a predetermined load fluctuation is generated in the alternating-current motor, shortens a period in which the feedback information is acquired until control of the alternating-current motor follows the load fluctuation in case that the load fluctuation is determined to be generated, and performs control for sequentially returning the period in which the feedback information is acquired to a reference value in case that the control of the alternating-current motor follows the load fluctuation.

According to this, it is possible to burden the control circuit with control of the acquisition period of the feedback information until the alternating-current motor skids due to a slip or the like and then recovers. It is possible to reduce a burden of the CPU in this point.

[4] <CPU Initializes Acquisition Period of Feedback Information>

In item 3, the CPU initializes the period in which the feedback information is acquired, and the control circuit sets the initialized period to a control target.

According to this, separately from the control of the acquisition period of the feedback information in the control circuit, the CPU requires setting control of the carrier period of the PWM circuit in accordance with a relationship with a rotation torque required for the feedback control, and thus it is economical, in view of a system, for the CPU to initialize a period in which the feedback information is acquired in the relationship with the rotation torque.

[5] <Load Fluctuation Sensing in Control Circuit (Rotor Angle, Motor Current)>

In item 3, the control circuit senses the predetermined load fluctuation from the rotor rotation angle value or the motor current value.

According to this, it is possible to easily acquire the fluctuation of the motor load without imposing a burden on the CPU.

[6] <Load Fluctuation Sensing in Control Circuit (State Detection Information of Traveling Surface)>

In item 5, the control circuit further predicts the predetermined load fluctuation from state detection information (RDST) of a traveling surface that receives a rotational force of the alternating-current motor.

According to this, the fluctuation of the motor load is predicted, and thus motor rotation control for suppressing a sudden fluctuation of the motor load can be performed by faster reaction.

[7] <Filter Arithmetic Operation, Averaging Arithmetic Operation>

In item 3, the predetermined arithmetic processing in the arithmetic circuit includes coordinate conversion processing (coordinate conversion portion 40) for converting the motor current value and the rotor rotation angle value into a two-phase current value, and filter arithmetic processing or average arithmetic processing (aggregate arithmetic portions 41d and 41q) for the two-phase current value on which coordinate conversion is performed.

According to this, the motor control device is suitable for a case where the alternating-current motor is driven using coordinate conversion by a direct-current power supply, and it is possible to easily aggregate a plurality of pieces of information by using the filter arithmetic processing or the average arithmetic processing.

[8] <Arithmetic Gain Control in Control Circuit>

In item 7, the control circuit further changes a gain of the filter arithmetic processing or the average arithmetic processing in the arithmetic circuit, as necessary, in case that the period in which the feedback information is acquired is set to be short, and performs control for returning the gain of the filter arithmetic processing or the average arithmetic processing to the initial value in case that the period in which the feedback information is acquired is returned to the reference value.

According to this, it is possible to decrease the gains in accordance with an increase in the number of acquisitions of the feedback information so that a response does not become sensitive without imposing a burden on the CPU, or to keep the gains unchanged due to a fast response in case that the number of acquisitions of the feedback information increases.

[9] <Initialization of Gain in CPU>

In item 8, the CPU initializes the gain of the filter arithmetic processing or the average arithmetic processing, and the control circuit sets the initialized gain to a control target.

According to this, separately from the control of the acquisition period of the feedback information in the control circuit, the CPU also requires gain setting depending on the setting of the carrier period of the PWM circuit in accordance with a relationship with a rotation torque required for the feedback control, and thus it is economical, in view of a system for the CPU to initialize a gain of the filter arithmetic processing or the average arithmetic processing in the relationship with the rotation torque.

[10] <Sampling Period Control in Control Circuit; Startup Trigger Interval of AD Conversion>

In item 7, the control circuit controls an AD conversion startup trigger interval of AD conversion processing of the fed-back current and a fetching interval of the rotor rotation angle value to the arithmetic circuit, to thereby determine the period in which the feedback information is acquired.

According to this, in follow-up control, it is possible to easily control the sampling period of the feedback information for obtaining the feedback information without imposing a burden on the CPU.

[11] <CPU Detects Load Fluctuation to Change Sampling Period>

In items 11 to 16, a function of the follow-up control portion in items 3 to 10 is replaced by a CPU. In item 2, the control unit (26A) includes an arithmetic circuit (47) that performs the predetermined arithmetic processing, and the CPU controls a sampling period of feedback information so as to be variable, determines whether a predetermined load fluctuation is generated in the alternating-current motor, shortens a period in which the feedback information is acquired until control of the alternating-current motor follows the load fluctuation in case that the load fluctuation is determined to be generated, and returns the acquisition period of the feedback information to a reference value in case that the control of the alternating-current motor follows the load fluctuation.

According to this, a burden of the CPU increases in the control of the acquisition period of the feedback information as compared to item 3, but it is possible to cope with the burden flexibly through software of the CPU.

[12] <Load Fluctuation Sensing in CPU (Rotor Angle, Motor Current)>

In item 11, the CPU senses the predetermined load fluctuation from rotor location information of a motor or a motor current.

According to this, a burden of the CPU increases as compared to item 5, but it is possible to easily acquire the fluctuation of the motor load.

[13] <Load Fluctuation Sensing in CPU (State Detection Information of Traveling Surface)>

In item 12, the CPU further predicts the predetermined load fluctuation from state detection information of a traveling surface that receives a rotational force of the alternating-current motor.

According to this, a burden of the CPU increases as compared to item 6, but the fluctuation of the motor load is predicted, and thus motor rotation control for suppressing a sudden fluctuation of the motor load can be performed by faster reaction.

[14] <Filter Arithmetic Operation, Averaging Arithmetic Operation>

In item 11, the predetermined arithmetic processing in the arithmetic circuit includes coordinate conversion processing for converting the motor current value and the rotor rotation angle value into a two-phase current value, and filter arithmetic processing or average arithmetic processing for the two-phase current value on which coordinate conversion is performed.

According to this, the motor control device is suitable for a case where the alternating-current motor is driven using coordinate conversion by a direct-current power supply, and it is possible to easily aggregate a plurality of pieces of information by using the filter arithmetic processing or the average arithmetic processing.

[15] <Arithmetic Gain Control in CPU>

In item 14, the CPU changes a gain of the filter arithmetic processing or the average arithmetic processing in the arithmetic circuit, as necessary, in case that the period in which the feedback information is acquired is set to be short, and performs control for returning the gain of the filter arithmetic processing or the average arithmetic processing to the initial value in case that the period in which the feedback information is acquired is returned to the reference value.

According to this, a burden of the CPU increases as compared to item 8, but, it is possible to decrease the gains in accordance with an increase in the number of acquisitions of the feedback information so that a response does not become sensitive without imposing a burden on the CPU, or to keep the gains unchanged due to a fast response in case that the number of acquisitions of the feedback information increases.

[16] <Sampling Period in CPU; Startup Trigger Interval of AD Conversion>

In item 14, the CPU controls an AD conversion startup trigger interval of AD conversion processing of the fed-back current and a fetching interval of the rotor rotation angle value to the arithmetic circuit, to thereby determine the acquisition period of the feedback information.

According to this, in the follow-up control, a burden of the CPU increases as compared to item. 10, but it is possible to easily control the sampling period of the feedback information for obtaining the feedback information.

[17] <Microcomputer>

In any one of items 1 to 16, the motor control device is constituted by a microcomputer which is formed as a semiconductor integrated circuit in a silicon substrate.

According to this, it is possible to contribute to a reduction in the size of the motor control device.

[18] <Making Sampling Period of Load Fluctuation Variable with respect to PWM Carrier Period>

A motor drive device (1) according to another embodiment different from that in items 1 to 18, the device driving an alternating-current motor (2) for vehicle traveling, includes an inverter (10) that supplies a motor current to the alternating-current motor, a motor control device (13) that performs feedback control on a motor current which is output by the inverter on the basis of a drive command. The motor control device includes a PWM circuit (23) that performs switch control on the inverter through a PWM pulse signal (Pu, Pv, Pw), a CPU (20) that performs feedback control on a duty of the PWM pulse signal, and an arithmetic unit (26, 26A), in which a sampling period of feedback information (id, iq, θ) is made variable, and which performs predetermined arithmetic processing for aggregating a plurality of pieces of the feedback information acquired in the sampling period shorter than a carrier period of the PWM circuit in a comparison target for one period of the carrier period in case that a predetermined load fluctuation is generated in the alternating-current motor. The CPU controls the duty of the PWM pulse signal after the predetermined load fluctuation is generated, on the basis of an arithmetic result in the arithmetic unit and the drive command value.

According to this, it is possible to acquire the feedback information in a period shorter than the carrier period in accordance with a predetermined fluctuation of a motor load, and to burden the arithmetic unit with an arithmetic operation for aggregating a plurality of pieces of feedback information, acquired in the carrier period alone, in the comparison target for one period of the carrier period. Therefore, in a situation where the rotation of the alternating-current motor becomes too fast with respect to the carrier period, motor rotation control for suppressing a sudden fluctuation of a motor load can be performed by faster reaction while suppressing an increase in an arithmetic control load of a CPU. Thus, it is possible to suppress a sudden fluctuation of the load by at least faster reaction to the skidding of a wheel, and to contribute to prevent an accident which is generated by the skid of a wheel due to a slip caused by sudden acceleration, abrupt steering, freezing road surface, and the like in an EV, an HV or the like.

[19] <Information of Motor Current and Rotor Angle of Motor>

In item 18, the feedback information is a motor current value which is obtained by performing AD conversion on a current which is fed back from the alternating-current motor and a rotor rotation angle value which is obtained from a rotor position of the alternating-current motor.

According to this, the same operational effect as that of item 2 is exhibited.

[20] <Control Circuit Detects Load Fluctuation to Change Sampling Period>

In item 19, the control unit (26) includes a control circuit (46) that controls a sampling period of feedback information so as to be variable in case that a predetermined load fluctuation is generated in the alternating-current motor, and an arithmetic circuit (47) that performs the predetermined arithmetic processing. The control circuit determines whether a predetermined load fluctuation is generated in the alternating-current motor, shortens a period in which the feedback information is acquired until control of the alternating-current motor follows the load fluctuation in case that the load fluctuation is determined to be generated, and performs control for sequentially returning the period in which the feedback information is acquired to a reference value in case that the control of the alternating-current motor follows the load fluctuation.

According to this, the same operational effect as that of item 2 is exhibited.

[21] <CPU Initializes Acquisition Period of Feedback Information>

In item 20, the CPU initializes the period in which the feedback information is acquired, and the follow-up control portion sets the initialized period to a control target.

According to this, the same operational effect as that of item 4 is exhibited.

[22] <Load Fluctuation Sensing in Control Circuit (Rotor Angle, Motor Current)>

In item 20, the control circuit senses the predetermined load fluctuation from the rotor rotation angle value or the motor current value.

According to this, the same operational effect as that of item 5 is exhibited.

[23] <Load Fluctuation Sensing in Control Circuit (State Detection Information of Traveling Surface)>

In item 22, the control circuit further predicts the predetermined load fluctuation from state detection information of a traveling road surface of a vehicle.

According to this, the same operational effect as that of item 6 is exhibited.

[24] <Filter Arithmetic Operation, Averaging Arithmetic Operation>

In item 20, the predetermined arithmetic processing in the arithmetic circuit includes coordinate conversion processing for converting the motor current value and the rotor rotation angle value into a two-phase current value, and filter arithmetic processing or average arithmetic processing for the two-phase current value on which coordinate conversion is performed.

According to this, the same operational effect as that of item 7 is exhibited.

[25] <Arithmetic Gain Control in Control Circuit>

In item 24, the control circuit further changes a gain of the filter arithmetic processing or the average arithmetic processing in the arithmetic circuit, as necessary, in case that the period in which the feedback information is acquired is set to be short, and performs control for returning the gain of the filter arithmetic processing or the average arithmetic processing to the initial value in case that the period in which the feedback information is acquired is returned to the reference value.

According to this, the same operational effect as that of item 8 is exhibited.

[26] <Initialization of Gain in CPU>

In item 25, the CPU initializes the gain of the filter arithmetic processing or the average arithmetic processing, and the control circuit sets the initialized gain to a control target.

According to this, the same operational effect as that of item 9 is exhibited.

[27] <Sampling Period Control in Control Circuit; Startup Trigger Interval of AD Conversion>

In item 24, the control circuit controls an AD conversion startup trigger interval of AD conversion processing of the fed-back current and a fetching interval of the rotor rotation angle value to the arithmetic circuit, to thereby determine the period in which the feedback information is acquired.

According to this, the same operational effect as that of item 10 is exhibited.

[28] <CPU Detects Load Fluctuation to Change Sampling Period>

In items 28 to 33, a function of the follow-up control portion in items 20 to 27 is replaced by a CPU. In item 19, the control unit (26A) includes an arithmetic circuit (47) that performs the predetermined arithmetic processing. The CPU (20) controls a sampling period of feedback information so as to be variable, determines whether a predetermined load fluctuation is generated in the alternating-current motor, shortens a period in which the feedback information is acquired until control of the alternating-current motor follows the load fluctuation in case that the load fluctuation is determined to be generated, and returns the period in which the feedback information is acquired to a reference value in case that the control of the alternating-current motor follows the load fluctuation.

According to this, the same operational effect as that of item 11 is exhibited.

[29] <Load Fluctuation Sensing in CPU (Rotor Angle, Motor Current)>

In item 29, the CPU senses the predetermined load fluctuation from the rotor rotation angle value or the motor current value.

According to this, the same operational effect as that of item 12 is exhibited.

[30] <Load Fluctuation Sensing in CPU (Road Surface Reflectance)>

In item 29, the CPU further predicts the predetermined load fluctuation from state detection information of a traveling road surface of a vehicle.

According to this, the same operational effect as that of item 13 is exhibited.

[31] <Filter Arithmetic Operation, Averaging Arithmetic Operation>

In item 28, the predetermined arithmetic processing in the arithmetic circuit includes coordinate conversion processing for converting the motor current value and the rotor rotation angle value into a two-phase current value, and filter arithmetic processing or average arithmetic processing for the two-phase current value on which coordinate conversion is performed.

According to this, the same operational effect as that of item 14 is exhibited.

[32] <Arithmetic Gain Control in CPU>

In item 31, the CPU changes a gain of the filter arithmetic processing or the average arithmetic processing in the arithmetic circuit, as necessary, in case that the period in which the feedback information is acquired is set to be short, and performs control for returning the gain of the filter arithmetic processing or the average arithmetic processing to the initial value in case that the period in which the feedback information is acquired is returned to the reference value.

According to this, the same operational effect as that of item 15 is exhibited.

[33] <Sampling Period Control in CPU; Startup Trigger Interval of AD Conversion>

In item 31, the CPU controls an AD conversion startup trigger interval of AD conversion processing of the fed-back current and a fetching interval of the rotor rotation angle value to the arithmetic circuit, to thereby determine the acquisition period of the feedback information.

According to this, the same operational effect as that of item 16 is exhibited.

[34] <ECU>

In any of items 10 to 17, the motor control device constitutes an ECU which is connected to an in-vehicle network.

According to this, the motor drive device is suitable for an EV or an HV.

2. Further Detailed Description of the Embodiments

A further detailed description of the embodiments will be given. Meanwhile, in all the drawings for the purpose of describing a mode for carrying out the invention, components having the same functions are denoted by the same reference numerals and signs, and thus the description thereof will not be repeated.

<<Motor Drive Device>>

FIG. 1 illustrates an example of a motor drive device. A motor drive device 1 shown in the drawing is a device that drives an alternating-current motor (MT) 2 which is a motive power source for EV or HV traveling. Although not particularly limited, a motor shaft of the alternating-current motor 2 is connected to a wheel 4 through a transmission 3. Further, the motor shaft of the alternating-current motor 2 has a resolver for detecting its rotation angle connected thereto. Although particularly not shown in the drawing, in a case of in-wheel motor drive, an alternating-current motor and a resolver are provided independently for each wheel.

The motor drive device 1 includes a 3-phase voltage-type inverter 10 using six insulated gate bipolar transistors (IGBT), a pre-driver 11, a resolver digital converter (RD converter) 12, a microcomputer (MCU) 13 which is an example of the motor control device, and a network transceiver (TRC) 14 which is connected to an in-vehicle network 6 such as CAN, and constitutes one ECU (Electronic Control Unit).

A drive current of the inverter 10 is detected as motor currents Iv and Iw, for example, by a current sensor 14, and is fed back to the microcomputer 13.

The resolver 5 inputs an excitation signal Smg from the RD converter 12, to output sine and cosine resolver signals Srs from a detection coil in accordance with the angle of a rotor. The RD converter 12 generates a motor rotation phase signal Rp such as an encoder-equivalent pulse signal from the resolver signal Srs and feeds back the generated signal to the microcomputer 13.

Although not particularly limited, the microcomputer 13 is formed in one semiconductor substrate such as single crystal silicon by a CMOS circuit manufacturing technique or the like.

The microcomputer 13 is an example of the motor control device that performs feedback control on the motor current which is output by the inverter on the basis of a drive command. Here, the pre-driver 11 and the RD converter 12 serve as external components of the microcomputer 13, but can also be built into the microcomputer 13.

The microcomputer 13 is connected to the network transceiver 14 through a network controller (COM) 22, and receives a detection signal from a sensor (SNSR) 7, or communicates with other ECUs (not shown).

The microcomputer 13 includes a CPU (Central Processing Unit) 20 as a central processing unit that executes a program, and an internal memory (MRY) 21 which is constituted by a non-volatile memory that stores a program executed by the CPU 20 or control data and a RAM which is used in a work area of the CPU 20. The microcomputer 13 includes a PWM circuit (PWM) 23 that outputs 3-phase PWM pulse signals Pu, Pv, and Pw for driving the inverter 10 to the pre-driver 11. Further, the microcomputer 13 includes an AD converter (ADC) 24 that converts an analog signal to a digital signal, a counter (COUNT) 25 that inputs and counts a phase signal, and an accelerator (ACCL) 26 as an arithmetic circuit that performs a required arithmetic operation and arithmetic control. Meanwhile, a circuit block inside the microcomputer 13 is capable of a signal interface through an internal bus 27 which is representatively shown.

The AD converter 24 performs AD conversion on the motor currents Iv and Iw of the motor in accordance with a sampling period indicated from the CPU 20 or the accelerator 26 to obtain motor current values iv and iw, and outputs the resultant to the accelerator 26 or the like. The counter 25 counts the motor rotation phase signal Rp which is input through the RD converter 12 to acquire an electrical angle (rotor rotation angle value indicating a rotor position of the motor) θ, and the acquired electrical angle θ is used for each required sampling period by the CPU 20 or the accelerator 26. The motor current values iv and iw and the electrical angle θ are an example serving as feedback information which is fed back to the accelerator 26 by the driving of the alternating-current motor.

Figure 2:
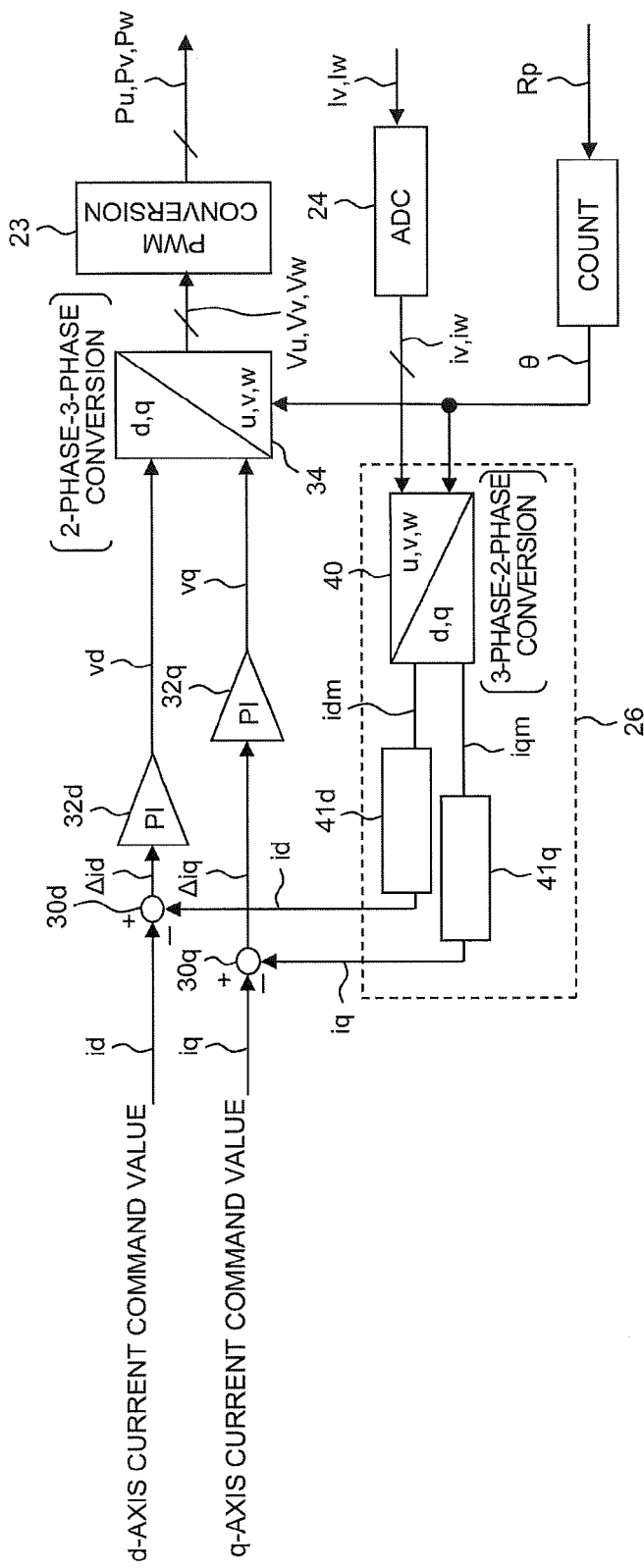
FIG. 2 is a block diagram illustrating, in principle, a PWM control function for vector control of an alternating-current motor in a CPU and an arithmetic function of an accelerator.

FIG. 2 illustrates, in principle, a PWM control function for vector control of the alternating-current motor in a CPU and an arithmetic function of the accelerator.

In a case of a vehicle, an output torque command of the motor is first determined from an accelerator opening degree, a vehicle speed or the like. In order to perform the vector control on the basis of this output torque command, d-axis and q-axis current command values id and iq are then calculated as drive command values. The output torque command is given to the CPU 20 through, for example, the network 6, and thus the CPU 20 calculates the d-axis current command value id and the q-axis current command value iq.

The d-axis current command value id and the q-axis current command value iq which are obtained are supplied to subtracters 30d and 30q. Here, deviations Δid and Δiq between a present d-axis current value idc and a present q-axis current value iqc are obtained. Regarding the obtained deviations Δid and Δiq, in PI arithmetic units 32d and 32q, a d-axis voltage command value Vd and a q-axis voltage command value Vq are calculated by a PI (Proportional-Integral) control arithmetic operation based on a proportional integral algorithm. That is, the d-axis and q-axis currents idc and iqc are corrected by the sum of a P feedback value obtained by multiplying the deviations Δid and Δiq by a P gain (proportional gain) and an I feedback value obtained by multiplying an integrated value of the deviations Δid and Δiq by an I gain (integration gain), and these values are converted into voltage command values to calculate the d-axis and q-axis voltage commands Vd and Vq.

The calculated d-axis and q-axis voltage command values Vd and Vq are supplied to a coordinate conversion portion 34 that performs coordinate conversion from 2-phase to 3-phase, and are subject to coordinate conversion from two axes of d and q to three axes of U, V, and W, and thus 3-phase motor drive voltage commands Vu, Vv, and Vw of which the phases are different from each other by 120 degrees are obtained. The obtained motor drive voltage command values Vu, Vv, and Vw are converted into the PWM pulse signals Pu, Pv, and Pw in the PWM circuit 23. This conversion is performed by comparing, for example, the motor drive voltage commands Vu, Vv, and Vw with, for example, a triangular wave of a predetermined frequency which is a carrier signal of a predetermined frequency (carrier frequency), and determining the duty ratio of the PWM pulse signals Pu, Pv, and Pw. In this manner, the PWM pulse signals Pu, Pv, and Pw of each phase are formed, and these pulse signals are supplied to the inverter 10 through the pre-driver 11.

The inverter 10 is configured to receive a direct-current voltage from a battery (not shown) between a positive-electrode line and a negative-electrode line, and to convert the received voltage into a 3-phase alternating current. For example, three series circuits are configured to be connected to each other between the positive-electrode line and the negative-electrode line, each of the series circuits being composed of two complementary insulated gate bipolar transistors, and a coupling node between the two complementary insulated gate bipolar transistors in each series circuit serves as an output of each phase. Each of the series circuits is operated complementarily switchably in the PWM pulse signals Pu, Pv, and Pw, and thus a 3-phase motor drive current is generated. The motor drive current is supplied to the motor 2, and the motor 2 is driven by an output according to the output torque command.

Here, the phase of the motor drive current is determined in accordance with the electrical angle (rotor position) of the motor 2. Therefore, the resolver 5 as an angle sensor is installed in the motor 2, the resolver signal Srs is output from the resolver 5 to the RD converter 12, and the RD converter 12 generates the motor rotation phase signal Rp.

The motor rotation phase signal Rp is counted in the counter 25 and has an offset error added thereto, and thus the electrical angle θ of the alternating-current motor 2 is calculated. The electrical angle θ is supplied to the coordinate conversion portion 34 and thus is used in phase control of the motor drive voltage commands Vu, Vv, and Vw. In addition, the electrical angle θ is supplied to the coordinate conversion portion 40 of the accelerator 26, and is used in the coordinate conversion of the motor current values iv and iw from 3-phase to 2-phase.

The coordinate conversion portion 40 performs coordinate conversion on the motor current values iv and iw, which are output from the AD converter 24, to the d and q-axes using the electrical angle θ, and calculates a d-axis current value idm and a q-axis current value iqm. The coordinate conversion arithmetic portion 34 may acquire the electrical angle θ required for a coordinate conversion arithmetic operation for each carrier period of the PWM circuit 23. On the other hand, the coordinate conversion portion 40 needs to acquire the electrical angle θ required for a coordinate conversion arithmetic operation for each sampling period of the motor current values iv and iw.

The d-axis current value idm and the q-axis current value iqm which are calculated are supplied to aggregate arithmetic portions 41d and 41q, and are subject to a predetermined arithmetic operation. The arithmetic results are supplied to the above-mentioned subtracters 30d and 30q as a present d-axis current value id and a present q-axis current value iq.

Here, a period in which the motor current values iv and iw and the electrical angle θ are generated is not limited to a carrier period unit of the PWM circuit 23, and is set to a short period of one severalth of the carrier period, to take into consideration the drastic load fluctuation of the alternating-current motor 2 so as to be capable of following the motor control. In case that a predetermined load fluctuation occurs in the alternating-current motor 2, the motor current values iv and iw and the electrical angle θ are acquired at an interval shorter than the carrier period of the PWM circuit 23, and the aggregate arithmetic portions 41d and 41q perform predetermined arithmetic processing, such as filter arithmetic processing or average arithmetic processing, for aggregating a plurality of d-axis current values idm and q-axis current values iqm for one period of the carrier period on which the coordinate conversion arithmetic operation is sequentially performed in the acquisition period, in a comparison target for one period of the carrier period. Meanwhile, in case that the sampling period of the motor current values iv and iw and the electrical angle θ is set to be equal to the carrier period of the PWM circuit 23, the filter arithmetic processing or the average arithmetic processing for the aggregation has no substantial meaning, and sampled information is output to the post-stage as it is.

Here, a relationship between the sampling period in which the motor current values iv and iw and the electrical angle θ are acquired and the carrier period will be described.

Figure 3:
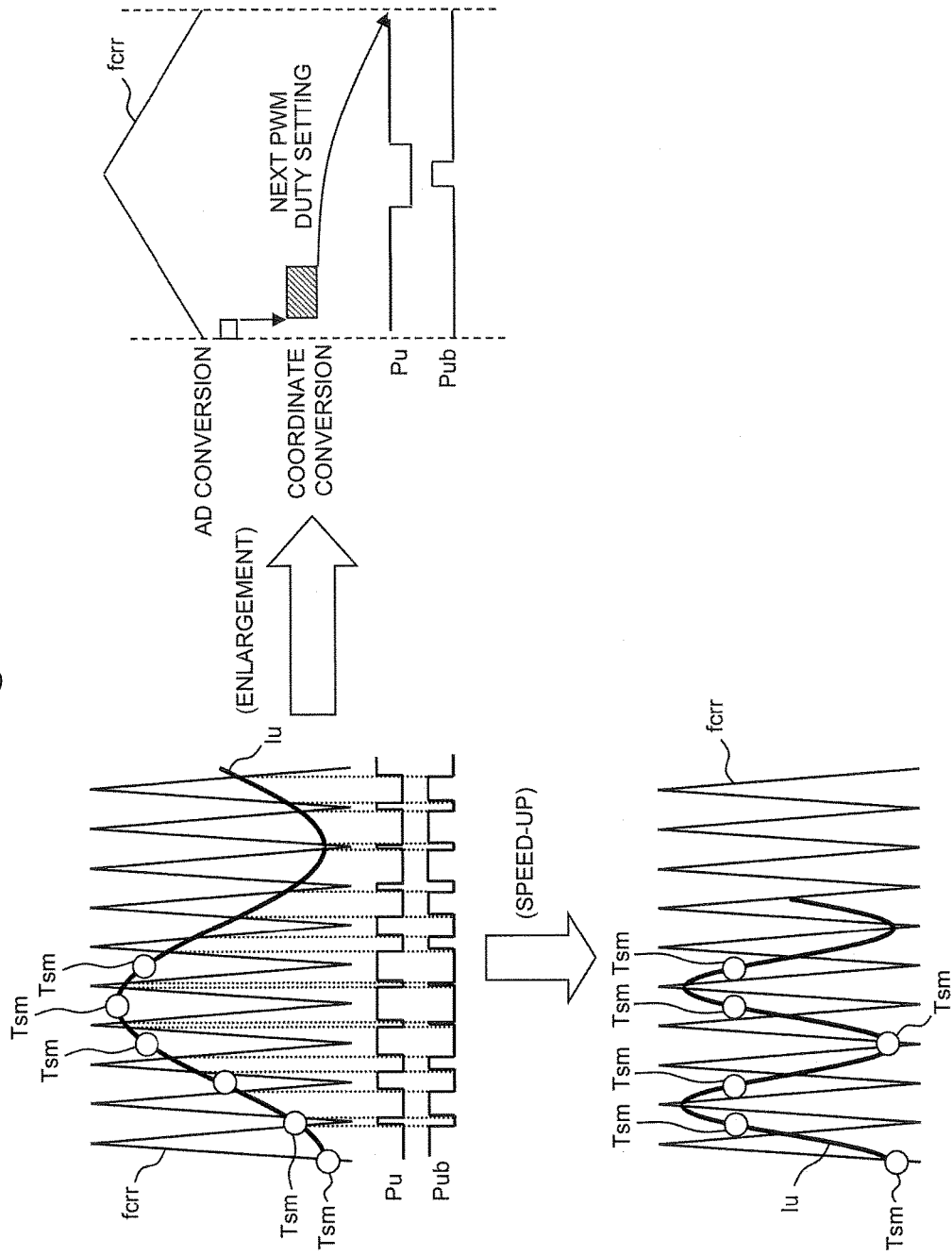
FIG. 3 is a diagram conceptually illustrating a case where a sampling period in which motor current values iv and iw and an electrical angle θ are acquired and a carrier period are coincident with each other.
Figure 4:
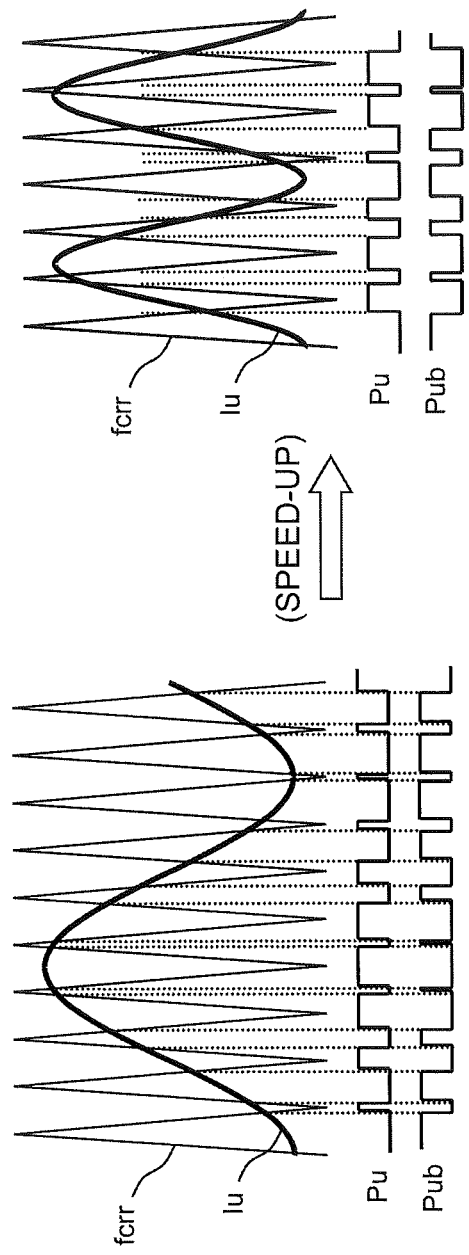
FIG. 4 is a diagram illustrating a case where a motor drive current is not easily represented by a sinusoidal wave through a PWM pulse in a motor current having a high frequency due to a fast motor rotation.

FIG. 3 conceptually illustrates a case where the sampling period in which the motor current values iv and iw and the electrical angle θ are acquired and the carrier period are coincident with each other. Here, fcrr is a conceptual carrier period of the PWM circuit 23, Iu is a 1-phase motor current waveform, Tsm is a sampling timing of the motor current, and Pu and Pub are 1-phase complementary PWM pulse signals. In a PWM operation in this example, the motor current values iv and iw and the electrical angle θ are sampled one time for each carrier period, and a coordinate conversion arithmetic operation (vector arithmetic operation) is performed on the resultant. The result is reflected in the setting of the next pulse duty of the PWM pulse signal. In this case, in case that a motor rotation quickens suddenly due to the slip of a wheel or the like, the frequency of a motor current waveform increases in accordance therewith, and thus the motor current can be acquired by AD conversion. However, since the frequency of the motor current waveform is higher than the carrier period, it is not possible to sample a sufficient number of times of the motor current value with respect to the waveform of its sinusoidal wave, and not to follow a PWM waveform in a direction in which the high rotation of the motor in response to the sudden fluctuation of the load is suppressed. In short, as illustrated in FIG. 4, the motor drive current is easily represented by a sinusoidal wave through a PWM pulse in the motor current having a low frequency in case that the motor rotation is slow, but the motor drive current is not easily represented by a sinusoidal wave through the PWM pulse in the motor current having a high frequency due to a fast motor rotation. The influence of one-time switching of a pulse waveform generation switch on which a switching operation is performed increases in accordance with the comparison result. In order to reduce the influence, the number of switching may be increased by increasing the number of times of sampling. However, in case that the motor rotation becomes too fast with respect to the carrier period in which the PWM operation is specified, the earliest motor current is not able to be acquired in a sinusoidal shape even in a case where the sampling interval of the motor current is shortened.

Consequently, since the PWM pulse in which the acquired current value is reflected is dependent on the carrier period, a plurality of motor current values or the like acquired as feedback information during the carrier period have to be arithmetically calculated collectively by filtering or averaging, to thereby reflect the resultant in a duty of the PWM pulse. The arithmetic portions 41d and 41q perform the arithmetic operation.

Figure 5:
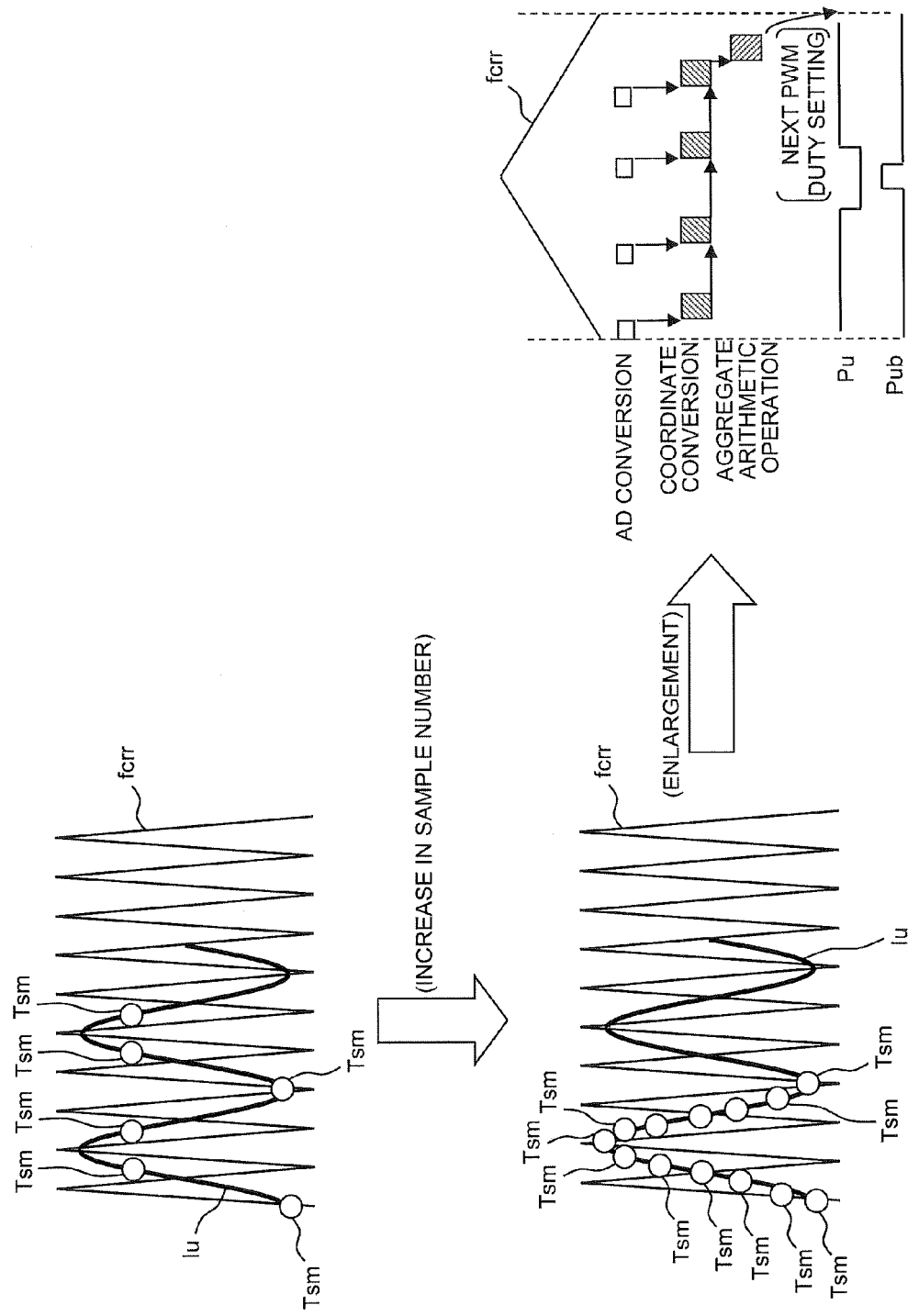
FIG. 5 is a diagram conceptually illustrating a process in case that the sampling period in which the motor current values iv and iw and the electrical angle θ are acquired is made shorter than the carrier period.

FIG. 5 conceptually illustrates a process in case that the sampling period in which the motor current values iv and iw and the electrical angle θ are acquired is made shorter than the carrier period, as such a processing method. In the PWM operation, the motor current values iv and iw and the electrical angle θ are sampled multiple times for each carrier period to perform the coordinate conversion arithmetic operation (vector arithmetic operation) on the resultants, and the coordinate conversion arithmetic results idm and iqm are aggregated in a comparison target for one period of the carrier period by performing a predetermined arithmetic operation such as averaging in the arithmetic portions 41d and 41q. The aggregated arithmetic results are reflected in the setting of the next pulse duty of the PWM pulse signal. Thereby, even in case that the motor rotation quickens suddenly due to the slip of a wheel and thus the frequency of the motor current waveform increases, a sufficient number of times of the motor current value is sampled with respect to the waveform of its sinusoidal wave, and thus it is possible to follow a PWM waveform in a direction in which the high rotation of the motor is suppressed.

Hereinafter, a description will be given of a specific control mode for following a PWM pulse in a direction in which the high rotation of the alternating-current motor due to a drastic load fluctuation is suppressed.

<<First PWM Pulse Follow-up Control Mode for Load Fluctuation>>

A first PWM pulse follow-up control mode will be described. In FIG. 2, functional blocks of the subtracters 30d and 30q, the PI arithmetic units 32d and 32q, the coordinate conversion portion 34 and the like except for the accelerator 26 and arithmetic sequence control using these blocks are assumed to be realized by the CPU 20 and its operating program. The accelerator 26 is realized by hardware different from the CPU 20.

In FIG. 2, the acquisition period (that is, startup period of an AD conversion operation for the motor currents Iv and Iw) of the motor current values iv and iw in the AD converter 24 is synchronized with the carrier period of the PWM circuit 23 by the control of the CPU 20. Similarly to this, the acquisition period of the electrical angle θ in the counter 25 becomes also the same as the startup period of the AD conversion operation. Hereinafter, such a period is simply denoted by the sampling period of feedback information (motor current values iv and iw and electrical angle θ) in the accelerator 26.

The sampling period of the feedback information is synchronized with the carrier period of the PWM circuit 23, and the synchronous control thereof includes synchronous control of the sampling period in the CPU and independent synchronous control of the sampling period in the accelerator 26, in the present embodiment.

The synchronous control of the sampling period in the CPU 20 is control conforming the sampling period to the carrier period, that is, control capable of once sampling the feedback information (motor current values iv and iw) for each carrier period. For example, the startup timing of a conversion operation of the AD conversion circuit 24 is set for each carrier period, and the electrical angle θ is output from the counter 25 in a period based thereon. Here, the carrier period of the PWM circuit 23 is set, in principle, in accordance with a torque command which is capable of being grasped from a current command value by the CPU 20. For example, a loss of PWM pulse drive is reduced even in case that the burden of control increases by decreasing the carrier period at the time of requiring a large torque, and preferentially, the burden of controlling the PWM pulse drive is not caused to increase by increasing the carrier period in case that a small torque may be satisfactory.

The independent synchronous control of the sampling period in the accelerator 26 is control for determining whether the accelerator 26 generates a predetermined load fluctuation in the alternating-current motor 2, shortening the sampling period of the feedback information (motor current values iv and iw and electrical angle θ) initialized by the CPU 20 until the high rotation of the alternating-current motor 2 subsides (until the PWM waveform is followed up in a direction in which the high rotation of the motor is suppressed) in case that the load fluctuation is determined to be generated, and returning the sampling period of the feedback information to a reference value which is an initialized value in case that the motor control follows the load fluctuation.

Figure 6:
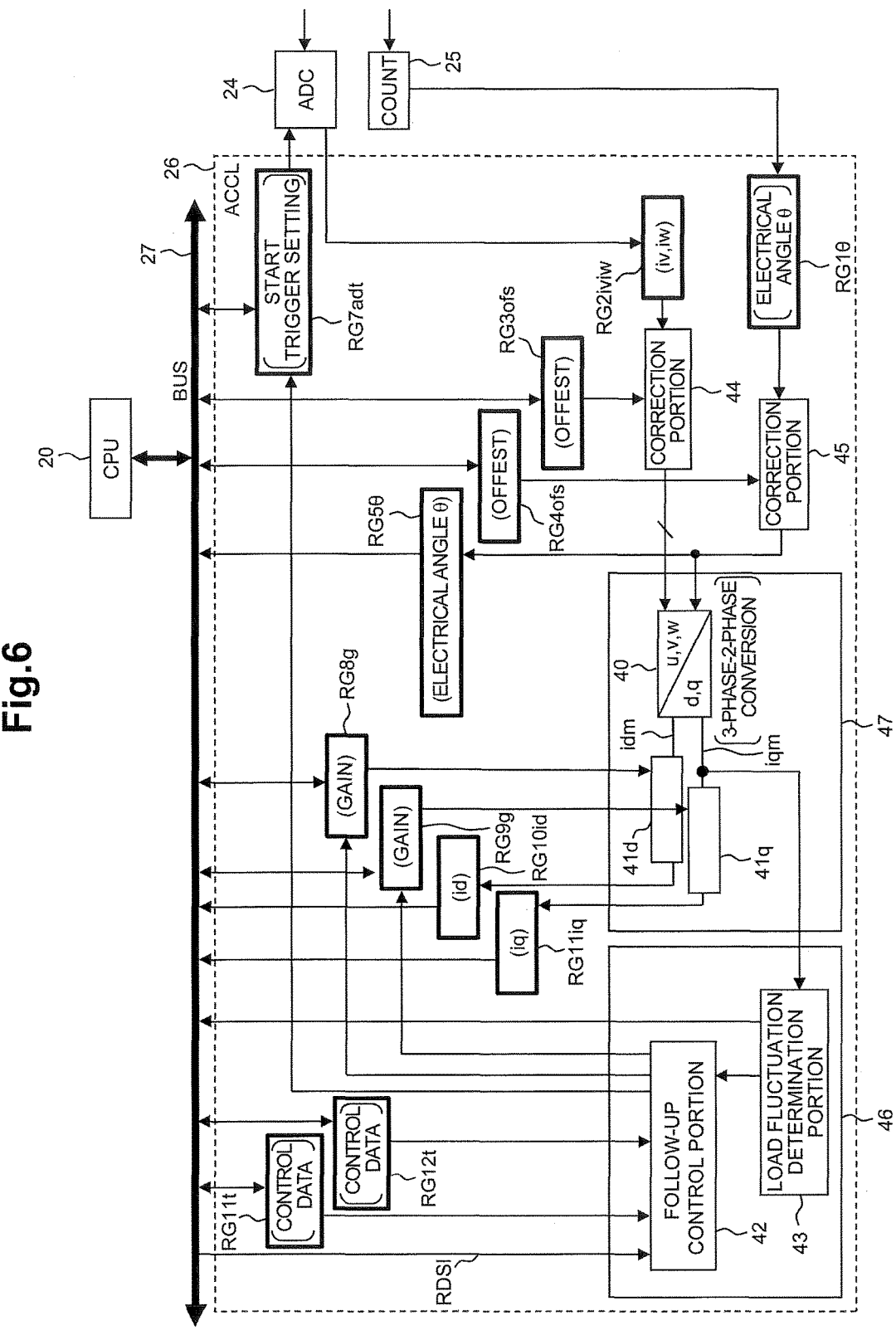
FIG. 6 is a block diagram illustrating a configuration of an accelerator for performing synchronous control of the sampling period.

FIG. 6 illustrates a configuration of the accelerator 26 for performing the synchronous control of the sampling period. The accelerator 26 includes a follow-up control portion 42, a load fluctuation determination portion 43, correction portions 44 and 45, and registers RG1θ to RG12t, in addition to the coordinate conversion portion 40 and the aggregate arithmetic portions 41d and 41q. The coordinate conversion portion 40 and the aggregate arithmetic portions 41d and 41q are an example of an arithmetic circuit 47 that performs an arithmetic operation for aggregating the feedback information. The follow-up control portion 42 and the load fluctuation determination portion 43 are an example of a control circuit 46 that controls the sampling period of the feedback information so as to be variable in case that a predetermined load fluctuation is generated in the alternating-current motor 2.

The register RG1θ is supplied with the electrical angle θ which is acquired in the counter 25, and the register RG2iviw is supplied with the motor currents iv and iw which are acquired in the AD converter 24. An offset value is set in the registers RG3ofs and RG4ofs by a CPU 20. The correction portion 44 corrects the motor currents iv and iw, supplied to the register RG2iviw, to the offset value which is set in the register RG3ofs. For example, in case that the AD conversion range of the AD converter is set to 0 to 5 V, a process of correcting an AD conversion value obtained thereby to a conversion value centering on 2.5 V is performed. The correction portion 45 corrects the electrical angle θ, supplied to the register RG1θ, to the offset value which is set in the register RG2ofs. For example, correction for offsetting misalignment due to a mechanical error such as the rotor position of the resolver 5 is performed. The motor currents iv and iw and the electrical angle θ which are corrected by the correction portions 44 and 45 are converted into the d-axis current value idm and the q-axis current value iqm by the coordinate conversion portion 40. The electrical angle θ is supplied to the register RG5θ, and the electrical angle θ which is supplied to the register RG5θ is referenced in synchronization with a required coordinate conversion timing by the CPU 20 constituting the coordinate conversion portion 34.

The setting of a startup trigger of an AD conversion operation by the AD converter 24 is performed on the register RG7adt by the CPU 20, or is performed on the register RG7adt by the follow-up control portion 42. The setting of the register RG7adt is performed by only the CPU 20 in the synchronous control of the sampling period in the CPU 20. On the other hand, in the independent synchronous control of the sampling period in the accelerator 26, the register RG7adt which is initialized by the CPU 20 is reset by the follow-up control portion 42, and thus an AD conversion operation period in the AD converter 24 is controlled so as to be variable.

The coordinate conversion portion 40 sequentially performs coordinate conversion in synchronization with the sampling period of the motor current in the AD converter 24, and the d-axis current value idm and the q-axis current value iqm on which the coordinate conversion is performed are subject to a filter arithmetic operation or an averaging arithmetic operation in the carrier period alone, respectively, in the aggregate arithmetic portions 41d and 41q. The averaging arithmetic operation is, for example, a process of performing an arithmetic average or a weighted average on the d-axis current value idm and the q-axis current value iqm in the carrier period alone. The filter arithmetic operation is, for example, a process of setting the d-axis current value idm and the q-axis current value iqm passing through a bandpass such as a bandpass filter, or the average value thereof, to the d-axis current value id and the q-axis current value iq. Gains which are set in the registers RG8g and RG9g are designated in arithmetic processing in the arithmetic portions 41d and 41q. For example, a weighted value for the average value on which the arithmetic operation is performed is determined to be a gain in a case of an arithmetic averaging process, and a weighted value for each of the d-axis current value idm and the q-axis current value iqm is determined to be a gain in a case of a weighted averaging process. In addition, in the filter arithmetic processing, a bandpass value or a cutoff value is determined to be a gain in accordance with the magnitudes of the d-axis current value id and the q-axis current value iq which are immediately preceding filter arithmetic results.

The setting of a corresponding gain is performed on the registers RG8g and RG9g by the CPU 20, or is performed on the registers RG8g and RG9g by the follow-up control portion 42. In the synchronous control of the sampling period in the CPU, the setting of the registers RG8g and RG9g is performed by only the CPU 20. On the other hand, in the independent synchronous control of the sampling period in the accelerator 26, RG8g and RG9g which are initialized by the CPU 20 are reset by the follow-up control portion 42. By this resetting, it is possible to cope with a difference in a weight included in one piece of sample data in response to a change (change in the sampling period of the motor current) in the AD conversion operation period by the AD converter 24, or a difference in an influence which is given to one pulse of the PWM pulse by one piece of sampling data.

The d-axis current value id and the q-axis current value iq on which the arithmetic operation is performed by the arithmetic portions 41d and 41q are set in the registers RG10id and RG11iq, the d-axis current value id and the q-axis current value iq which are set are referenced by the CPU 20, and the process of the subtracters 30*d* and 30*q* is performed.

Although not particularly limited, the load fluctuation determination portion 43 detects the fluctuation of a motor load on the basis of the q-axis current value iqm which is a component corresponding to a torque of the motor load. For example, the fluctuation of the motor load is detected on the basis of the change rate of the q-axis current value iqm. The detection result thereof is given to the follow-up control portion 42. In addition, the load fluctuation can also be detected by the CPU 20 acquiring a detection signal of the sensor (SNSR) 7 of FIG. 1 which is disposed outside the microcomputer 1 from the network 6. For example, the sensor 7 receives a reflected signal from a vehicle traveling road, and the CPU 20 gives the change of the reflected signal as a road surface state signal RDSI to the follow-up control portion 42. The follow-up control portion 42 predicts a drastic load drop of the alternating-current motor on the assumption of sudden entrance into a freezing road surface or a rainwater road surface on the basis of the road surface state signal RDSI.

In case that a drastic drop of the motor load, that is, a drastic torque drop is detected on the basis of the detection output of the load fluctuation determination portion 43 or the road surface state signal RDSI, the follow-up control portion 42 starts the autonomous synchronous control of the sampling period in the accelerator 26. Control data required for this control is set in the registers RG11*t* and RG12*t*, for example, by the CPU 20. For example, the control data is data indicating the carrier period of PWM, and data indicating the shortening degree of the sampling period of the autonomous synchronous control, the change degree of the gain, and the like. The follow-up control portion 42 refers to such control data from the registers RG11*t* and RG12*t*, and thus performs the setting of a startup trigger in the register RG7*adt*, the setting of gains in the registers RG8*g* and RG9*g*, and the autonomous synchronous control of the sampling period by controlling the conversion period of the coordinate conversion portion 40.

Figure 7:
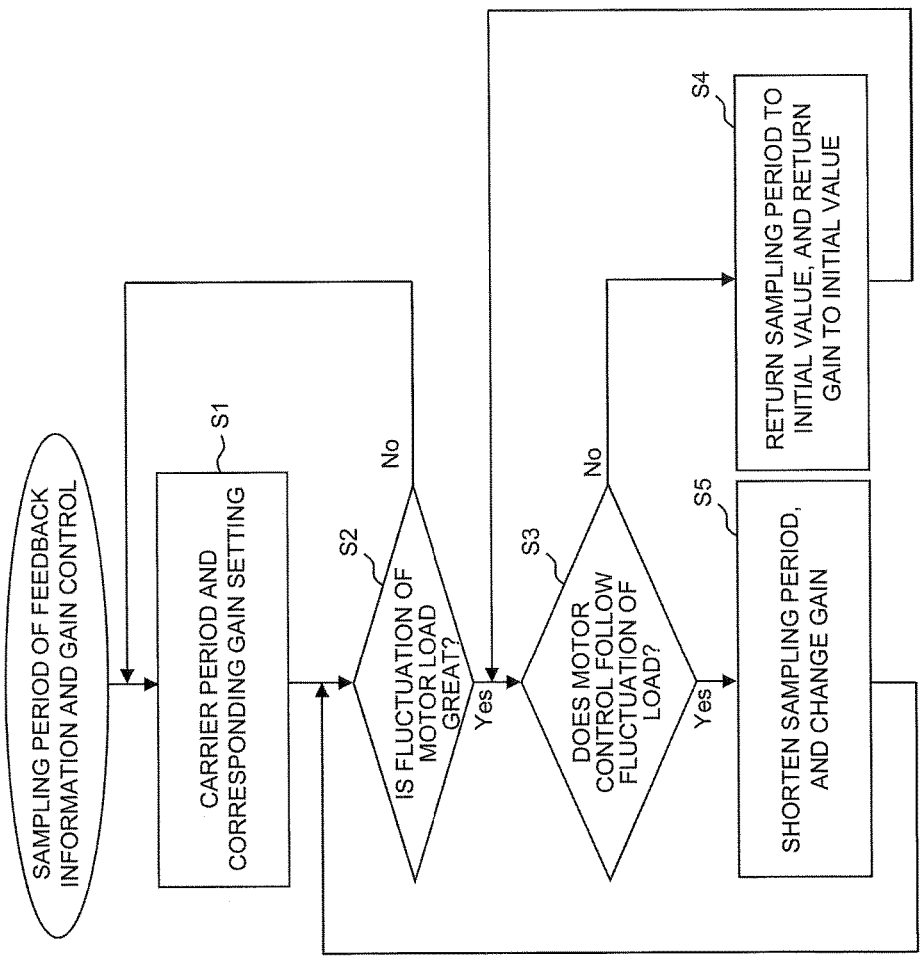
FIG. 7 is a flow diagram illustrating a processing procedure of autonomous synchronous control of the sampling period together with a synchronous control procedure of the sampling period in a CPU.

FIG. 7 illustrates a processing procedure of the autonomous synchronous control of the sampling period together with a synchronous control procedure of the sampling period in the CPU. The sampling period of the feedback information and the gain control of the arithmetic portions 41*d* and 41*q* are aggregated in, for example, steps S1 to S5 of FIG. 7. Step S1 is a process of the CPU. The CPU 20 determines the carrier period according to a necessary torque, sets the control data in the registers RG11*t* and RG12*t*, initializes the startup trigger of AD conversion, that is, the sampling period in the register RG7adt in accordance with the carrier period, and sets the gains in the registers RG8*g* and RG9*g*. Thereby, the CPU 20 drives and controls the alternating-current motor 2 in accordance with the current command values id and iq while feeding back the motor current.

In case that the alternating-current motor 2 is rotated by the control of the CPU 20, the load fluctuation determination portion 43 determines whether a great fluctuation of the motor load is generated from the q-axis current value iqm which is acquired in the coordinate conversion portion 40 (S2). For example, the determination portion determines a drastic drop of the load caused by the high rotation of the motor 2 due to the slip of a wheel, that is, whether the q-axis current value iqm becomes equal to or less than a threshold. In case that the load fluctuation is determined to be great, the load fluctuation determination circuit portion 43 sets a load fluctuation flag (not shown). The load fluctuation flag can also be referenced by the CPU 20. In a state where the fluctuation of the motor load is not great, the process of step S1 is performed in accordance with the load in that case.

In case that the fluctuation of the motor load is great, the follow-up control portion 42 takes charge of the PWM control of the alternating-current motor, and it is determined whether the motor control follows the fluctuation of the load (S3). This determination is performed, for example, by the load fluctuation determination circuit determining whether the q-axis current value iqm becomes larger than the threshold as described above. In case that the control of the motor current does not follow the fluctuation of the load by restoring the high rotation of the motor due to the drastic fluctuation of the load, the drive current of the motor 2 is not formed in a sinusoidal shape, and thus the motor rotation becomes unstable.

In case that the control of the motor current does not follow the fluctuation of the load, the follow-up control portion 42 shortens the sampling period in the carrier period in that case in accordance with the control data of the register RG12*t*, and thus the setting of the gains of the arithmetic portions 41*d* and 41*q* is changed (S4). Thereby, since the sampling number of the motor current in the carrier period tends to increase, the drive current based on the PWM pulse can be brought close to a sinusoidal shape. Thereby, whether the rotation of the motor is restored, that is, the control of the motor current follows the fluctuation of the load is determined successively in step S3. In case that the following is not yet performed for each determination, the setting change may be performed so that follow-up responsiveness is raised gradually by further shortening the sampling period in step S4. In case that the following is performed, the follow-up control portion 42 returns the sampling period and the gain to a state before the operation in step S4, clears the load fluctuation flag, and entrusts the synchronous control of the sampling period to the control of the CPU 20.

Figure 8:
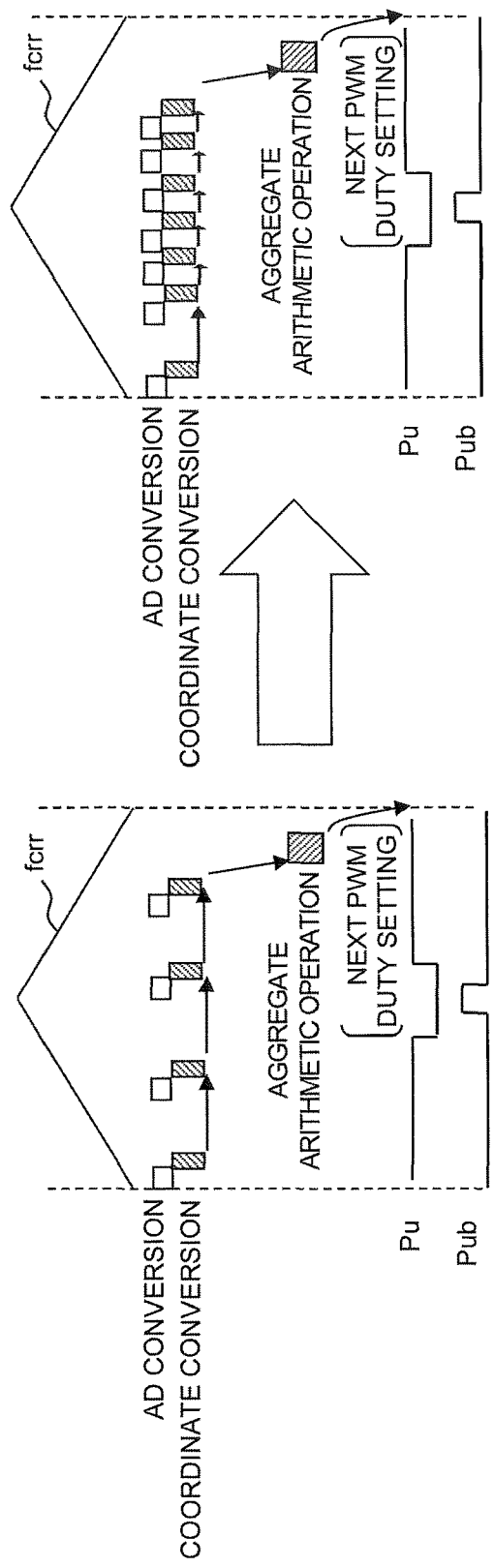
FIG. 8 is a diagram illustrating a processing mode for shortening the sampling period halfway in case that a great load fluctuation is detected in the middle of the carrier period in the autonomous synchronous control of the sampling period.

In the synchronous control of the sampling period in the CPU 20, as illustrated in FIG. 8, the number of times of sampling of the feedback information can also be controlled to multiple times such as four times in one period of the carrier period. The number of times of sampling may be determined in accordance with the magnitude of the carrier period, depending on an operating program of the CPU 20.

Further, in the autonomous synchronous control of the sampling period, as illustrated in FIG. 8, in case that a great load fluctuation is detected in the middle of the carrier period, the sampling period may be shorten halfway.

Figure 9:
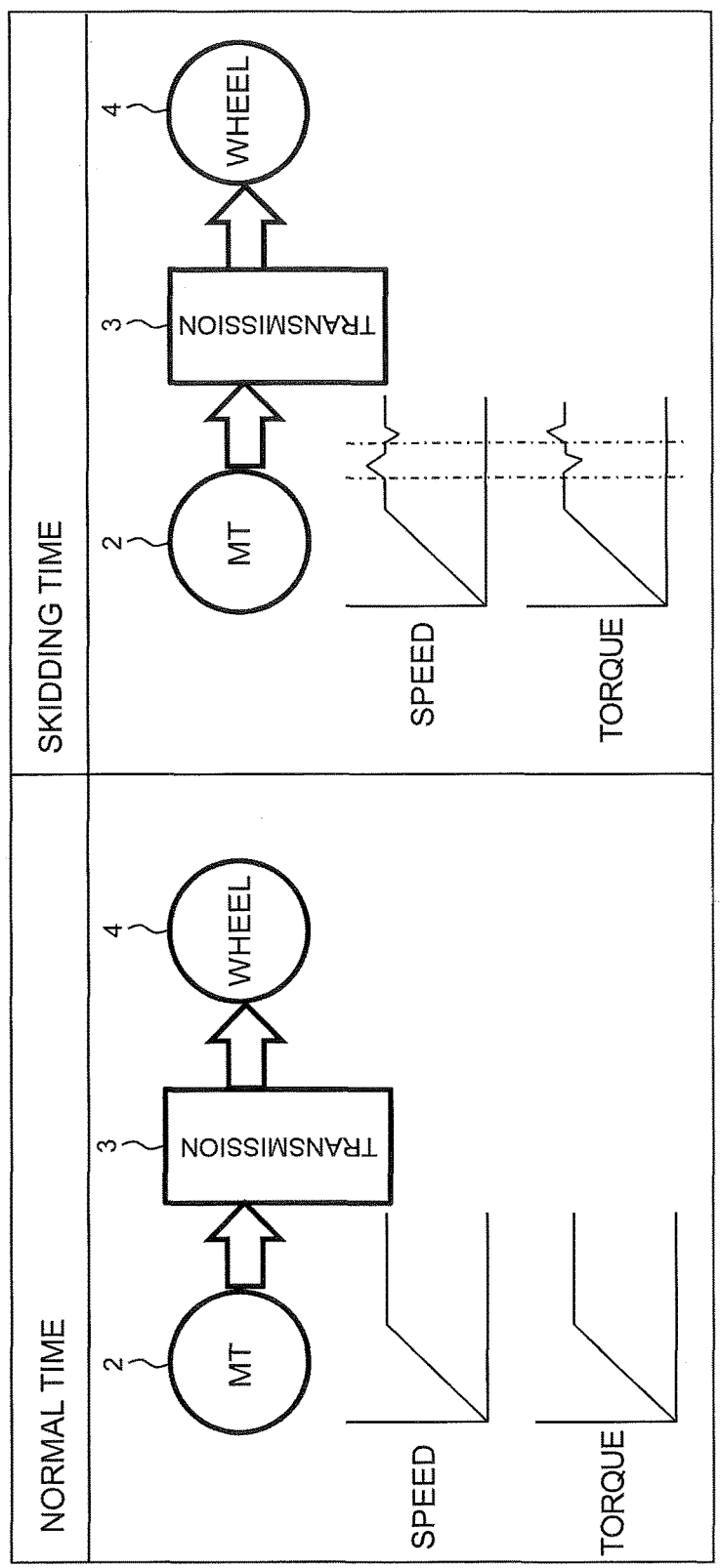
FIG. 9 is a diagram illustrating a control mode in the skidding of a wheel and the return thereof to a normal rotation.

FIG. 9 illustrates a control mode in the skidding of a wheel and the return thereof to a normal rotation. At the time of normal traveling in which the skidding is not generated, a torque corresponds to the rotational speed of the motor. On the other hand, in case that a torque is reduced at the time of the skidding of a wheel due to road surface freezing, the sudden stepping of an accelerator, or the like, the rotational speed of the motor becomes faster. In case that a torque increases at the time of the settlement of the skidding, the rotational speed of the motor becomes lower. Basic control in the CPU 20 at the time of the skidding and the settlement of the skidding is as follows. In case that a wheel skids due to a slip or the like, the rotation of the motor 20 proceeds, and the load of the motor 20 is reduced. In this case, the CPU 20 delays a rise in PWM pulse, adjusts a torque of the motor 20 by performing a process of reducing a duty ratio of the PWM pulse signal, and attempts to restore the rotation speed of the motor 20. In that case, the follow-up control portion 42 performs control for generating motor current values id and iq based on feedback so as to improve follow-up responsiveness of the motor control with respect to the fluctuation of the load by shortening the sampling period in response to the sudden fluctuation of the load such as a reduction in the motor load. Thereafter, in case that the slip is stopped and the skidding of a wheel is settled, the rotation of the motor 20 becomes slower, and the load of the motor 20 increases. Then, the CPU 20 quickens a rise timing of the PWM pulse, adjusts a torque of the motor 20 by performing a process of increasing the duty ratio of the PWM pulse signal, and attempts to restore the rotation speed of the motor 20. In that case, the follow-up control portion 42 does not respond to a sudden fluctuation of the load such as an increase in the motor load, and entrusts control to the CPU 20.

According to the autonomous synchronous control of the sampling period in the accelerator 26, the following operational effects are obtained.

(1) The sampling period of the feedback current for a great fluctuation of the motor load is shortened by the accelerator 26 which is separate hardware from the CPU 20, and an arithmetic operation is performed in which motor current values obtained thereby are arranged by filtering, averaging or the like, to thereby perform a process of reflecting the resultant in a duty of the PWM pulse. Thereby, even in case that the motor rotation quickens suddenly due to the slip of a wheel and thus the frequency of the motor current waveform increases, a sufficient number of times of the motor current value is sampled with respect to the waveform of its sinusoidal wave, and thus it is possible to follow a PWM waveform so as to suppress undesired high rotation of the motor. It is possible to considerably reduce a burden of the CPU 20 in this follow-up control.

(2) Since it is possible to burden the follow-up control portion 42 with control of the acquisition period of the feedback information until the alternating-current motor skids due to a slip or the like and then recovers, it is possible to reduce a burden of the CPU 20 in this point.

(3) Since the follow-up control portion 42 senses the predetermined load fluctuation from the motor current value iqm, it is possible to easily acquire the fluctuation of the motor load without imposing a burden on the CPU 20.

(4) In case that the sampling period of the feedback information is shortened, the follow-up control portion 42 changes the gains of the arithmetic portions 41d and 41q as necessary, and performs control for restoring the gains of the arithmetic portions 41d and 41q in case that the sampling period is returned to a reference value. Therefore, it is possible to decrease the gains in accordance with an increase in the number of acquisitions of the feedback information so that a response does not become sensitive without imposing a burden on the CPU 20, or to keep the gains unchanged due to a fast response in case that the number of acquisitions of the feedback information increases.

(5) Since the accelerator 26 is dedicated hardware which is separate hardware from the CPU 20, the accelerator has a tendency to optimize the number of arithmetic bits, the arrangement of registers with respect to the arithmetic circuit, or the like, and thus is suitable for the speed-up of data processing. The CPU 20 can also perform higher-speed processing at a lower operating frequency and with a small circuit scale, lower power consumption can be achieved than in a case where the CPU is entirely burdened, and it is also contribute to an improvement in the exothermic characteristics of a product.

(6) Since the feedback information which is fed back to the accelerator is the motor current values iv and iw which are obtained by performing AD conversion on a current which is fed back from the alternating-current motor 2 and an electrical angle which is obtained from the rotor position of the alternating-current motor 2, the feedback information is suitable for vector control of the alternating-current motor 2.

(7) Separately from the follow-up control of the follow-up control portion 42, the CPU 20 requires setting control of the carrier period of the PWM circuit 23 in accordance with a relationship with a rotation torque required for the feedback control, and thus it is economical, in view of a system, for the CPU 20 to initialize a period in which the feedback information is acquired in the relationship with the rotation torque.

(8) Separately from the follow-up control of the follow-up control portion 42, the CPU 20 also requires gain setting in response to the setting of the carrier period of the PWM circuit 23 in accordance with the relationship with the rotation torque required for the feedback control, and thus it is economical, in view of a system, for the CPU 20 to initialize the gains of the arithmetic portions 41d and 41q in the relationship with the rotation torque.

(9) The follow-up control portion 42 predicts the predetermined load fluctuation from the state detection information RDSI of a traveling surface that receives a rotational force of the alternating-current motor, and thus motor rotation control for suppressing a sudden fluctuation of the motor load can be performed by faster reaction.

(10) The follow-up control portion 42 controls an AD conversion startup trigger interval of AD conversion processing of a current to be fed back and a fetching interval of the rotor rotation angle value to the arithmetic circuit, to thereby determine a period in which the feedback information is acquired, and thus it is possible to easily control the sampling period of the feedback information for obtaining the feedback information without imposing a burden on the CPU 20 in the follow-up control.

<<Second PWM Pulse Follow-up Control Mode for Load Fluctuation>>

In the first PWM pulse follow-up control mode, a description has been given on the assumption that the follow-up control portion 42 does not perform a change in the carrier period determined by the CPU 20. In a second PWM pulse follow-up control mode, the carrier period as well as the sampling period can be changed with respect to a sudden fluctuation of the load.

Figure 10:
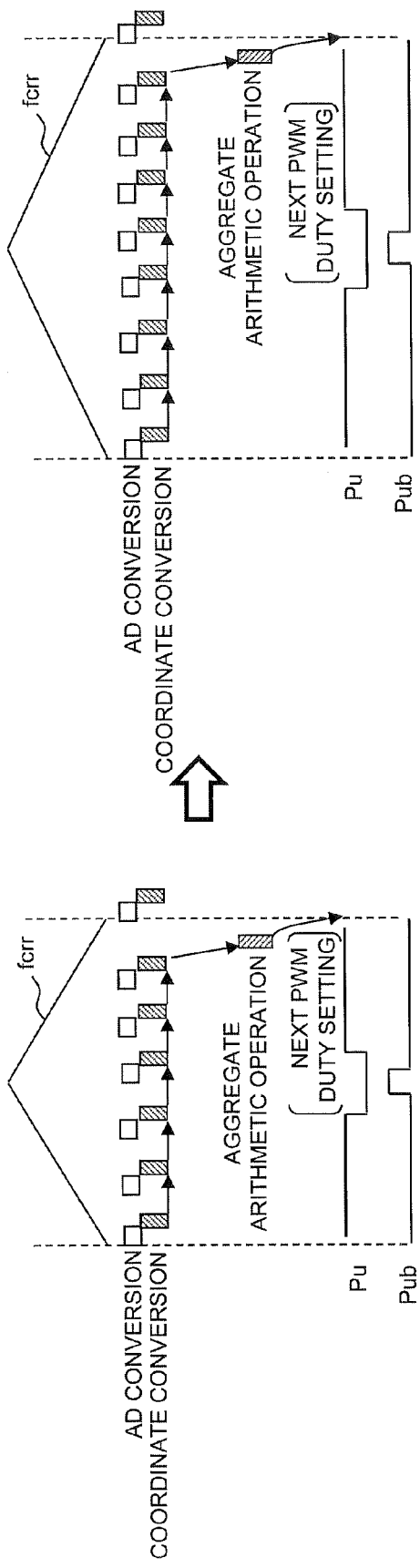
FIG. 10 is a diagram illustrating an operation mode in case that the carrier period is changed together with the sampling period with respect to the sudden fluctuation of a load.

FIG. 10 illustrates an operation example in case that the carrier period is changed together with the sampling period with respect to a sudden fluctuation of the load. In case that there is a sudden fluctuation of the load, only the number of times of sampling of the feedback information is increased first in the process of step S4 of FIG. 7, without changing the carrier period. Thereby, in case that it is determined that the motor control does not follow the load fluctuation (S3), follow-up responsiveness may have a tendency to be improved by lengthening the carrier period and increasing the number of times of sampling in the next step S4.

<<Third PWM Pulse Follow-up Control Mode for Load Fluctuation>>

In the first PWM pulse follow-up control mode, a description has been given on the assumption that the sampling period of the feedback information is shortened only in case that there is a sudden fluctuation of the load. In a third PWM pulse follow-up control mode, the number of times of sampling within the carrier period is made variable in accordance with the motor load (motor rotation speed) in the synchronous control of the sampling period in the CPU 20.

Figure 11:
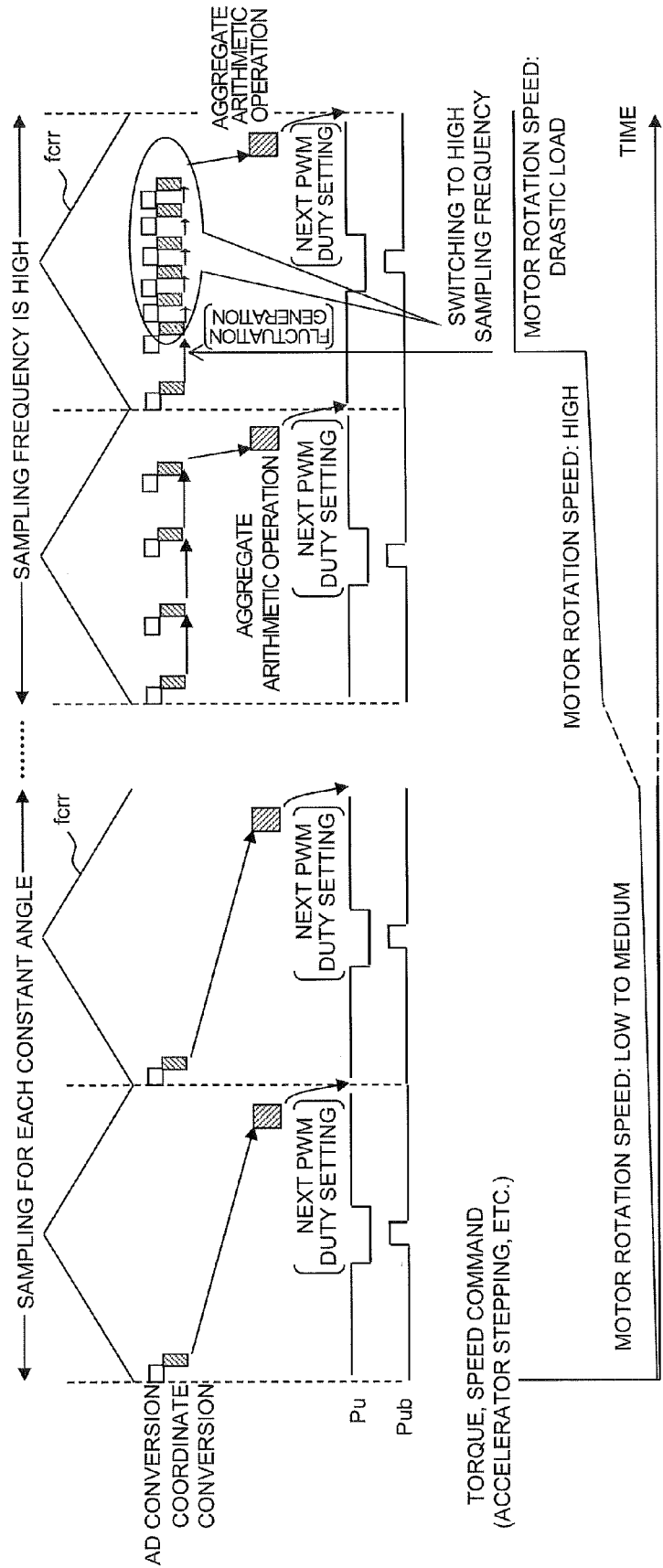
FIG. 11 is a diagram illustrating a processing mode in which the number of times of sampling with the carrier period is made variable in accordance with a motor load (motor rotation speed) in the synchronous control of the sampling period in a CPU.

In the synchronous control of the sampling period in the CPU 20, as illustrated in FIG. 11, the feedback information is sampled at the rate of one time per period of the carrier period from the low speed of the motor rotation to the medium speed thereof, and the feedback information is sampled at the rate of four times per period of the carrier period at the high speed of the motor rotation. The number of times of sampling may be determined in accordance with the motor rotation, depending on the operating program of the CPU 20. In case that there is a drastic load fluctuation in a state of the high rotation, the responsiveness of the PWM control for restoring the motor rotation by further shortening the sampling period is improved by the synchronous control of the sampling period in the accelerator 26.

<<Fourth PWM Pulse Follow-up Control Mode for Load Fluctuation>>

In the first PWM pulse follow-up control mode, the follow-up control portion 42 is adopted giving top priority to a reduction in the control burden of the CPU 20, and the operations of the coordinate conversion portion 40 and the arithmetic portions 41*d* and 41*q* which are dedicated arithmetic circuits are controlled. In a fourth PWM pulse follow-up control mode, on the assumption that there is a margin capable of burdening the CPU 20A with only the control thereof, the CPU 20A is caused to execute the control.

Figure 12:
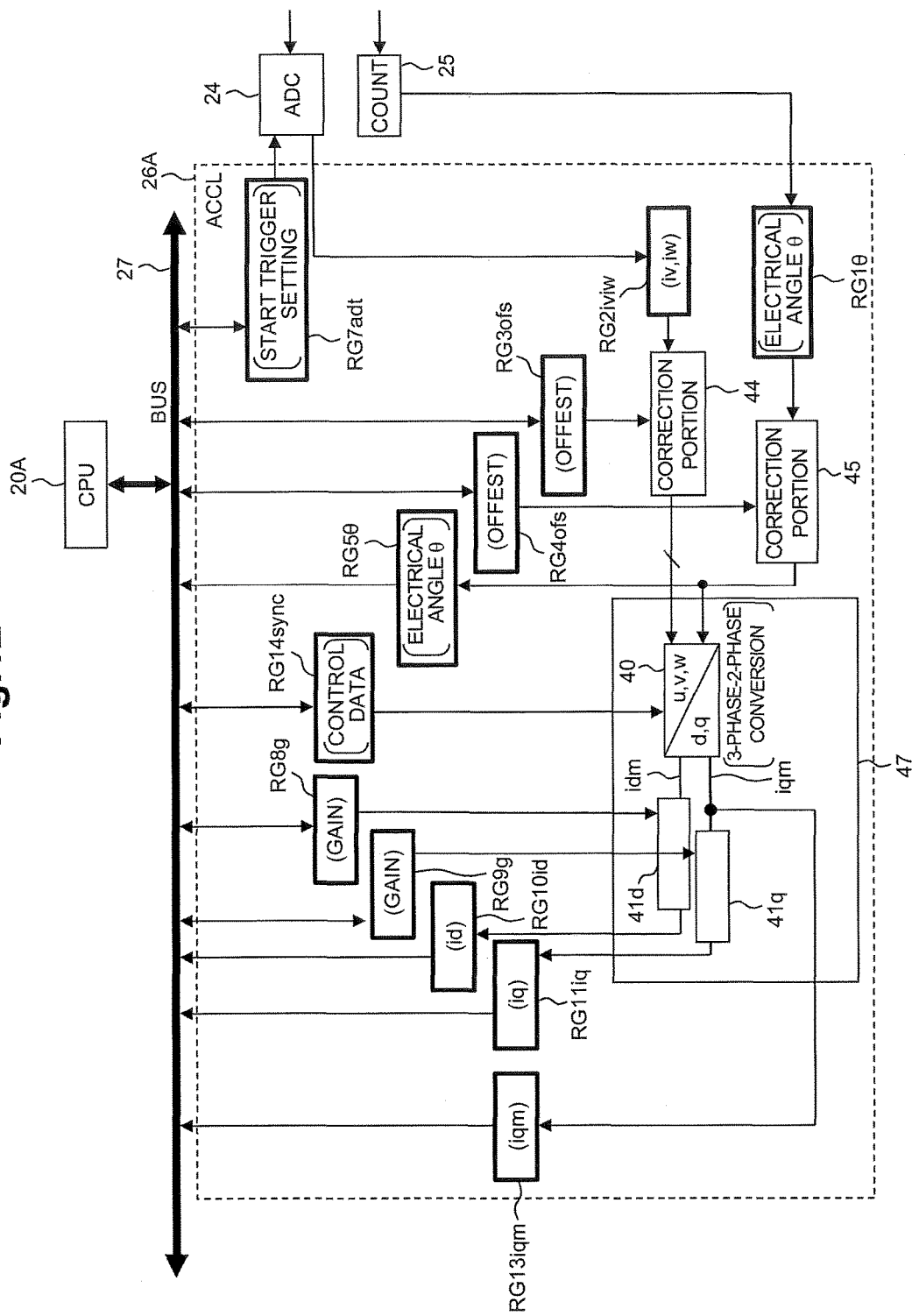
FIG. 12 is a block diagram illustrating a configuration of the accelerator in which a CPU is burdened with a control function of a control circuit in the accelerator of FIG. 6.

In this case, as illustrated in FIG. 12, in an arithmetic circuit 26A, the CPU 20A is burdened with a control function of the follow-up control portion 42 and a determination function of the load fluctuation determination portion 43. The CPU 20A is configured to be capable of referring to the motor current value iqm through the register RG13*iqm*. The coordinate conversion portion 40 performs coordinate conversion at a necessary timing by the carrier period and the sampling period in that case being transferred by control data which is set in the register RG14*sync*, from the CPU 20A. Naturally, the CPU 20A performs a setting operation of a startup trigger for the register RG7*adt* for shortening the sampling period at time of the load fluctuation and a setting operation of gains for the registers RG8*g* and RG9*g* corresponding thereto.

Meanwhile, other configurations in the fourth PWM pulse follow-up control mode are the same as those of the first PWM pulse follow-up control mode, and thus the detailed description thereof will not be given. The second and third PWM pulse follow-up control modes can also be applied to the fourth PWM pulse follow-up control mode.

According to the fourth PWM pulse follow-up control mode, as represented by FIG. 6, a burden of the CPU 20A increases in the control of the acquisition period of the feedback information as compared to a case where the follow-up control portion 42 is adopted, but it is possible to cope with the burden flexibly through software of the CPU 20A.

As described above, while the invention devised by the inventor has been described specifically based on the embodiments thereof, the invention is not limited to the embodiments, and it goes without saying that various changes and modifications may be made without departing from the scope of the invention.

For example, the arithmetic unit in which the accelerator has been described as an example can also be configured to use all or some of arithmetic functions of a general-purpose DSP or the like. An aggregate arithmetic processing function in the arithmetic unit is not limited to filtering or averaging, and can be appropriately changed. The state detection information of the traveling surface is not limited to a change in the reflectance of a road surface, and a shake or the like responding to the irregularities of a road surface may be detected. The motor control device is not limited to a one-chip microcomputer, and may be a mulita-chip semiconductor module or the like. The rotation angle detection of the motor shaft is not limited to use of the resolver.

INDUSTRIAL APPLICABILITY

The invention can be widely applied to not only an automobile such as an EV or an HV, but also a motor-driven train and other machinery and appliances using a motor as a drive source.

EXPLANATION OF REFERENCE NUMERALS

1: motor drive device
2: alternating-current motor (MT)
3: transmission
4: wheel
5: resolver
6: in-vehicle network
7: sensor (SNSR)
10: inverter
11: pre-driver
12: resolver digital converter
13: microcomputer (MCU)
14: current sensor
Iv, Iw: motor current
Smg: excitation signal
Srs: resolver signal
Rp: motor rotation phase signal of layer U, V, and W
20, 20A: CPU
21: internal memory (MRY)
22: network controller (COM)
23: PWM circuit (PWM)
24: AD converter (ADC)
25: counter (COUNT)
26, 26A: accelerator (ACCL)
27: internal bus
iv, iw: motor current value
θ: electrical angle (rotor rotation angle value indicating rotor position of motor)
id: d-axis current command value
iq: q-axis current command value
30*d*, 30*q*: subtracter
idc: present d-axis current value
iqc: present q-axis current value
Δid, Δiq: deviation
32*d*, 32*q*: PI arithmetic unit
Vd: d-axis voltage command
Vq: q-axis voltage command
34: coordinate conversion portion
Vu, Vv, Vw: 3-phase motor drive voltage command
Pu, Pv, Pw: PWM pulse signal
40: coordinate conversion portion
idm: d-axis current value
iqm: q-axis current value
41*d*, 41*q*: aggregate arithmetic portion
46: control circuit
47: arithmetic circuit

What is claimed is:
1. A motor control device comprising:
   a PWM (Pulse-width modulation) circuit for performing switch control on an inverter that outputs a drive current to an alternating-current motor through a PWM-pulse signal;

a CPU (Central Processing Unit) that performs feedback control on a duty of the PWM pulse signal; and an arithmetic unit, in which a sampling period of feedback information is made variable, and which performs predetermined arithmetic processing for aggregating the feedback information acquired in the sampling period shorter than a carrier period of the PWM circuit in a comparison target for one period of the carrier period in case that a predetermined load fluctuation is generated in the alternating-current motor, wherein the CPU controls the duty of the PWM pulse signal after the predetermined load fluctuation is generated, on the basis of an arithmetic result in the arithmetic unit and a drive command value, wherein the feedback information is a motor current value which is obtained by performing AD conversion on a current which is fed back from an alternating-current motor and a rotor rotation angle value which is obtained from a rotor position of the alternating-current motor, wherein in case that a predetermined load fluctuation is generated in the alternating-current motor, a control unit includes a control circuit that controls a sampling period of feedback information so as to be variable, and an arithmetic circuit that performs the predetermined arithmetic processing, and the control circuit determines whether a predetermined load fluctuation is generated in the alternating-current motor, shortens a period in which the feedback information is acquired until control of the alternating-current motor follows the load fluctuation in case that the load fluctuation is determined to be generated, and performs control for returning the period in which the feedback information is acquired to a reference value, in case that the control of the alternating-current motor follows the load fluctuation;

wherein the predetermined arithmetic processing in the arithmetic circuit includes coordinate conversion processing for converting the motor current value and the rotor rotation angle value into a two-phase current value, and filter arithmetic processing or average arithmetic processing for the two-phase current value on which coordinate conversion is performed, and wherein the control circuit further changes a gain of the filter arithmetic processing or the average arithmetic processing in the arithmetic circuit, as necessary, in case that the period in which the feedback information is acquired is set to be short, and performs control for returning the gain of the filter arithmetic processing or the average arithmetic processing to the initial value in case that the period in which the feedback information is acquired is returned to the reference value.

2. The motor control device according to claim 1, wherein the CPU initializes the gain of the filter arithmetic processing or the average arithmetic processing, and the control circuit sets the initialized gain to a control target.

3. The motor control device according to claim 1, wherein the control unit includes the arithmetic circuit that performs the predetermined arithmetic processing, and the CPU controls a sampling period of feedback information so as to be variable, determines whether a predetermined load fluctuation is generated in the alternating-current motor, shortens a period in which the feedback information is acquired until control of the alternating-current motor follows the load fluctuation in case that the load fluctuation is determined to be generated, and returns the period in which the feedback information is acquired to a reference value in case that the control of the alternating-current motor follows the load fluctuation.

4. The motor control device according to claim 3, wherein the CPU senses the predetermined load fluctuation from the rotor rotation angle value or the motor current value.

5. The motor control device according to claim 4, wherein the CPU further predicts the predetermined load fluctuation from state detection information of a traveling surface that receives a rotational force of the alternating-current motor.

6. The motor control device according to claim 3, wherein the predetermined arithmetic processing in the arithmetic circuit includes coordinate conversion processing for converting the motor current value and the rotor rotation angle value into a two-phase current value, and filter arithmetic processing or average arithmetic processing for the two-phase current value on which coordinate conversion is performed.

7. The motor control device according to claim 6, wherein the CPU controls an AD conversion startup trigger interval of AD conversion processing of the fed-back current and a fetching interval of the rotor rotation angle value to the arithmetic circuit, to thereby determine the acquisition period of the feedback information.

8. The motor control device according to claim 1, wherein the motor control device is constituted by a microcomputer which is formed as a semiconductor integrated circuit in a silicon substrate.

9. A motor control device comprising:
a PWM (Pulse-width modulation) circuit for performing switch control on an inverter that outputs a drive current to an alternating-current motor through a PWM pulse signal;
a CPU (Central Processing Unit) that performs feedback control on a duty, of the PWM pulse signal; and
an arithmetic unit, in which a sampling period of feedback information is made variable, and which performs predetermined arithmetic processing for aggregating the feedback information acquired in the sampling period shorter than a carrier period of the PWM circuit in a comparison target for one period of the carrier period in case that a predetermined load fluctuation is generated in the alternating-current motor,
wherein the CPU controls the duty of the PWM pulse signal after the predetermined load fluctuation is generated, on the basis of an arithmetic result in the arithmetic unit and a drive command value,
wherein the feedback information is a motor current value which is obtained by performing AD conversion on a current which is fed back from an alternating-current motor and a rotor rotation angle value which is obtained from a rotor position of the alternating-current motor,
wherein a control unit includes the arithmetic circuit that performs the predetermined arithmetic processing, and
the CPU controls a sampling period of feedback information so as to be variable, determines whether a predetermined load fluctuation is generated in the alternating-current motor, shortens a period in which the feedback information is acquired until control of the alternating-current motor follows the load fluctuation in case that the load fluctuation is determined to be generated, and returns the period in which the feedback information is acquired to a reference value in case that the control of the alternating-current motor follows the load fluctuation, wherein the predetermined arithmetic processing in the arithmetic circuit includes coordinate conversion processing for converting the motor current value and the rotor rotation angle value into a two-phase current value, and filter arithmetic processing or average arithmetic processing for the two-phase current value on which coordinate conversion is performed, and wherein the CPU changes a gain of the filter arithmetic processing or the average arithmetic processing in the arithmetic circuit, as necessary, in case that the period in which the feedback information is acquired is set to be short, and performs control for returning the gain of the filter arithmetic processing or the average arithmetic processing to the initial value in case that the period in which the feedback information is acquired is returned to the reference value.

10. The motor control device according to claim 9, wherein in case that a predetermined load fluctuation is generated in the alternating-current motor, the control unit includes a control circuit that controls a sampling period of feedback information so as to be variable, and an arithmetic circuit that performs the predetermined arithmetic processing, and the control circuit determines whether a predetermined load fluctuation is generated in the alternating-current motor, shortens a period in which the feedback information is acquired until control of the alternating-current motor follows the load fluctuation in case that the load fluctuation is determined to be generated, and performs control for returning the period in which the feedback information is acquired to a reference value in case that the control of the alternating-current motor follows the load fluctuation.

11. The motor control device according to claim 10, wherein the CPU initializes the period in which the feedback information is acquired, and the control circuit sets the initialized period to a control target.

12. The motor control device according to claim 11, wherein the control circuit senses the predetermined load fluctuation from the rotor rotation angle value or the motor current value.

13. The motor control device according to claim 11, wherein the control circuit further predicts the predetermined load fluctuation from state detection information of a traveling surface that receives a rotational force of the alternating-current motor.

14. The motor control device according to claim 10, wherein the predetermined arithmetic processing in the arithmetic circuit includes coordinate conversion processing for converting the motor current value and the rotor rotation angle value into a two-phase current value, and filter arithmetic processing or average arithmetic processing for the two-phase current value on which coordinate conversion is performed.

15. The motor control device according to claim 14, wherein the control circuit controls an AD conversion startup trigger interval of AD conversion processing of the fed-back current and a fetching interval of the rotor rotation angle value to the arithmetic circuit, to thereby determine the period in which the feedback information is acquired.

* * * * *